(12) United States Patent
Matsuura et al.

(10) Patent No.: US 7,436,379 B2
(45) Date of Patent: Oct. 14, 2008

(54) REVERSIBLE IMAGE DISPLAY MEDIUM

(75) Inventors: Masahiko Matsuura, Suita (JP); Hiroshi Mizuno, Ikoma (JP); Akihito Ikegawa, Sakai (JP); Masaharu Kanazawa, Suita (JP); Keyaki Yogome, Kyoto (JP); Takaji Kurita, Osakasayama (JP)

(73) Assignee: Minolta Co., Ltd., Osaka (JP)

( * ) Notice: Subject to any disclaimer, the term of this patent is extended or adjusted under 35 U.S.C. 154(b) by 550 days.

(21) Appl. No.: 11/129,291

(22) Filed: May 16, 2005

(65) Prior Publication Data

US 2005/0212748 A1    Sep. 29, 2005

Related U.S. Application Data

(62) Division of application No. 09/987,842, filed on Nov. 16, 2001, now Pat. No. 6,900,789.

(30) Foreign Application Priority Data

Nov. 16, 2000  (JP)  ............................. 2000-350201
Nov. 16, 2000  (JP)  ............................. 2000-350219

(51) Int. Cl.
    *G09G 3/34* (2006.01)

(52) U.S. Cl. ........................... 345/84; 345/55; 345/107; 345/204; 359/296; 359/302; 347/112; 347/153; 430/19; 430/32; 430/41

(58) Field of Classification Search .................. 345/31, 345/55, 107, 204, 84, 85; 359/295, 296, 359/302; 347/111, 112, 151–153; 430/19, 430/32, 41, 48

See application file for complete search history.

(56) References Cited

U.S. PATENT DOCUMENTS

| 4,126,854 A | 11/1978 | Sheridon |
| 4,143,103 A | 3/1979 | Sheridon |
| 5,982,346 A | 11/1999 | Sheridon et al. |
| 6,045,955 A | 4/2000 | Vincent |

(Continued)

OTHER PUBLICATIONS

Gugrae-Jo, et al, "New Toner Display Device: Image Display Using Conductive Toner And Charge Transport Layer" Japan Hardcopy '99, The Annual Conference Of The Imaging Society Of Japan, Jul. 21-23, 1999, pp. 249-252.

*Primary Examiner*—Henry N Tran
(74) *Attorney, Agent, or Firm*—McDermott Will & Emery LLP

(57) ABSTRACT

Disclosed is a reversible image display medium which can be repeatedly used and can display high quality images, in which cells between the two substrates accommodate a dry developer containing at least two kinds of frictionally chargeable dry developing particles having different chargeable polarities and different optical reflection densities; images are displayed by forming an electrostatic latent image corresponding to the image to be formed on one of the two substrates to drive the developing particles in an electrostatic field based on the electrostatic latent image; a developer-facing surface of one of the substrates has a surface resistivity of at least $1 \times 10^{12}$ ohm/square; a developer-facing surface of the opposite substrate has a surface resistivity from $1 \times 10^{6}$ ohm/square to $1 \times 10^{12}$ ohm/square; a developer-facing surface of one of the substrates has a surface average median roughness Ra of 0.2 μm to 0.5 μm; and an external surface of the substrate on image observation side has a surface average median roughness Ra of 0.2 μm to 0.7 μm.

12 Claims, 10 Drawing Sheets

U.S. PATENT DOCUMENTS

| | | |
|---|---|---|
| 6,184,856 B1 | 2/2001 | Gordon et al. |
| 6,285,382 B1 | 9/2001 | Wakahara et al. |
| 6,352,776 B1 | 3/2002 | Hayashi et al. |
| 6,407,763 B1 * | 6/2002 | Yamaguchi et al. ......... 347/112 |
| 6,411,316 B1 * | 6/2002 | Shigehiro et al. ........... 347/112 |
| 6,472,048 B1 | 10/2002 | Kakihara |
| 6,515,790 B2 * | 2/2003 | Miyamoto et al. .......... 359/296 |
| 6,636,186 B1 * | 10/2003 | Yamaguchi et al. ............ 345/31 |
| 6,774,879 B2 * | 8/2004 | Miyamoto et al. ............ 345/84 |

* cited by examiner

REVERSIBLE IMAGE DISPLAY MEDIUM

CROSS-REFERENCE TO RELATED APPLICATION

This application is a divisional of 09/987,842, filed Nov. 16, 2001 now U.S. Pat. No. 6,900,789 and is based on Japanese Patent applications No.2000-350201 and No.2000-3502 19 filed in Japan on Nov. 16, 2000, respectively, the contents of which are hereby incorporated by reference.

BACKGROUND OF THE INVENTION

1. Field of the Invention

The present invention relates to an image display medium, and particularly relates to a reversible image display medium, in which image displaying and image erasing operations can be repeated.

2. Description of the Background Art

At present, image display is performed, e.g., in the following manners. A person uses a pencil, a pen, paints or the like, and manually writes or draws characters, pictures or the like on an image display medium such as paper sheet. Also, a computer, a word processor or the like is used to display text, graphics or the like on a display such as a CRT display, or output them on a medium such as a paper sheet via a printer for display.

A copying machine or the like may be used for producing duplication, on a medium of paper or the like, of the texts, pictures, graphics or the like, which are produced on the medium of paper or the like by a person or by a printer. A facsimile machine may be used for sending such contents (texts, pictures, graphics and others) prepared in the above manner for producing duplication on another medium of paper or the like.

The above image display, which is performed to display the texts, pictures or the like on the image display medium of paper or the like by a pencil, pen or the like, or by an image forming apparatus such as a printer, a copying machine or a facsimile machine operating in a electrophotographic method, an ink-jet method, a heat transfer method or the like, can achieve clear image display in a high resolution, and thus can achieve easy-on-the-eyes display.

However, it is impossible to repeat display and erasure of the images on the image display medium of paper or the like. In the case where the paper is used for writing characters or the like by a pencil, the characters can be erased by an eraser to a certain extent. However, it is difficult to erase completely the characters or the like written in an ordinary density, although it may be possible when written in a light density. The medium of paper or the like can not be reused except for the case of using the rear surface of the medium, which is not yet used for the image display.

Accordingly, the medium of paper or the like bearing images will be abandoned or burnt when it is not longer required. This results in consumption of a large mount of resources. The printer, copying machine or the like also consume consumable products or materials such as toner or ink. For obtaining the new display medium of paper or the like as well as toner, ink or the like, energies and resources are required for producing them. This is contrary to the current demand for reduction in environmental loads.

In contrast to the above, the image display by a display such as a CRT display can repeat the image display and the image erasure. However, the resolution, clarity and precision of images are restricted, as compared with the images displayed by the printer or the like on the paper medium or the like. Thus the image display by a display is improper especially when used for displaying the text documents mainly composed of letters because of low resolution. If it is used for displaying sentences which continue in less than the frame-size volume, it will do. However, if the sentences continue in twice or more times the frame-size volume, they may be difficult to read and to understand. Due to the relatively low resolution and the light emission from the display, operations for a long time are likely to be hard to eyes.

Electrophoretic display (EPD) and Twist ball-type display (TBD) have been proposed as an image display method allowing repetition of the image display and image erasure. Further displaying method was recently proposed, which is disclosed in "Japan Hardcopy '99, the book of the thesis, pp. 249-252".

In the electrophoretic display method, two substrates including at least one transparent substrate are opposed together with a spacer therebetween to form a closed space therebetween, and the space is filled with a display liquid formed of a dispersion medium and electrophoretic particles, which are dispersed in the dispersion medium and are different in color from the medium. The image display is performed by an application of an electrostatic field and in a color of the particles or a color of the dispersion medium.

The display liquid is usually formed of isoparaffin-contained dispersion medium, particles of titanium dioxide or the like, dyes applying contrast in color to the particles, and an additive such as a surface active agent, or a charge applying agent.

In the electrophoretic display, the display is performed by utilizing contrast between particles of a high refractive index (e.g., titanium dioxide particles) and colored insulating liquid, and therefore the particles can not hide the colored liquid to a high extent, resulting in a low contrast.

Furthermore, there is a limitation on the kind of dye which is dissolved in a high concentration in a nonpolar solvent of high resistance which allows the electrophoresis of particles. A dye showing a white color is not found. Nor known is a black dye having a high extinction coefficient. Therefore the background portion becomes colored so that it is difficult to achieve a good contrast by a white background. When white particles for formation of images are placed into a colored liquid, the colored liquid may be moved between the substrate and the layer of white particles which are moved to the image observation side substrate, or the colored liquid may come into between the white particles, thereby lowering the contrast. The electrophoretic particles can scarcely uniformly adhere to the image observation side substrate, and thus the resolution is low.

Further, settling and condensation of particles are liable to occur due to a very large difference in specific gravity between the particles and the dispersion medium in the display liquid. This is liable to lower the display contrast. Further, it is difficult to display the images with high stability for a long time, and remaining of last images is liable to occur. Further, the degree of charging of the particles in the liquid significantly changes with time, which also impairs the stability of the image display.

In the twist ball-type display method, images can be displayed in specified colors using an image display medium containing numerous microcapsules enclosing not only an insulating liquid but also fine spheric particle so processed that a half of their surface and the other surface portion show colors or an optical density which differs from each other. Images are displayed in predetermined colors by rotating the fine spheric particles in the microcapsules due to an electric field strength or magnetic strength.

However, according to the twist ball-type display, images are displayed using fine spherical particles in the insulating liquid within the microcapsules. This makes it difficult to attain good contrast. Further, the resolution is low since spaces are formed between the microcapsules. In the manufacture of microcapsules, difficulty is entailed in reducing the size of microcapsules to increase the resolution.

The "Japan Hardcopy '99, the book of the thesis, pp. 249-252" discloses an image displaying method wherein a closed space is formed by placing two substrates as opposed to each other and as spaced from each other, i.e. the two substrates being a laminate of electrodes and a charge transporting layer, the space being used to enclose the electrically conductive toner and insulating particles which are different in color from the toner, an electrostatic field being applied to inject charges into the electrically conductive toner so that the toner is moved by a Coulomb force applied thereto to display images.

However, the foregoing image displaying method utilizing the charge injection phenomenon poses problems. When the electrically conductive toner carrying the injected charges is moved, insulating particles (e.g. white particles mixed together to form the color of background) interfere with the movement of the toner particles, making their movement so difficult that some of them may stop their movement. This results in failure to obtain satisfactory image density and good contrast and in reduction of image display rate. To overcome these problems, a high voltage drive is necessitated. The resolution is determined by the electrodes and is so limited. Furthermore, it is essential to use electrodes, charge-injection layer and electrically conductive toner, which results in limited manufacture.

SUMMARY OF THE INVENTION

Accordingly, an object of the invention is to provide a reversible image display medium, which allows repeating of image display and image erasure, and thereby can reduce consumption of image display mediums of paper or the like relating to the conventional image display and consumable materials such as developers and ink so that a current demand for reduction in environmental loads can be satisfied.

Another object of the invention is to provide a reversible image display medium, which allows image display in good contrast and high quality.

Still another object of the invention is to provide a reversible image display medium, which allows image display in high resolution and high quality, and more specifically, in high resolution as compared with the electrophoretic display and the twist ball-type display, and also in higher resolution when image display is performed based on an electrostatic latent image without employing opposite electrodes.

Yet another object of the invention is to provide a reversible image display medium, which allows stable image display of high quality for a long time.

Further another object of the invention is to provide a reversible image display medium, which can suppress remaining of last image(s), and therefore can exhibit good reversibility so that an image of good quality can be displayed.

Further another object of the invention is to provide a reversible image display medium, which can reduce a drive voltage required for image display.

A further object of the invention is to provide a reversible image display medium, which allows quick image display.

The present invention relates to a reversible image display medium, which basically has the following structure.

The reversible image display medium comprises:
two substrates opposed to each other with a predetermined gap therebetween;
one or more developer accommodating cells formed between the two substrates, and each having a periphery surrounded by a partition wall; and
a dry developer contained in each of the cell(s), the dry developer containing at least two kinds of frictionally chargeable dry developing particles having different chargeable polarities and different optical reflection densities.

The invention provides reversible image display mediums having such basic structure and the following features.

(1) First Reversible Image Display Medium

This reversible image display medium has the following feature: on one of the two substrates in the medium, an electrostatic latent image corresponding to an image to be displayed is formed so that image display can be performed by driving the developing particles in an electric field based on the electrostatic latent image. A surface, which faces the developing particles, of the substrate for carrying the electrostatic latent image has a surface resistivity of at least $1 \times 10^{12}$ ohm/square ($\Omega/\square$).

(2) Second Reversible Image Display Medium

This reversible image display medium has the following feature: on one of the two substrates, an electrostatic latent image corresponding to an image to be displayed is formed so that image display can be performed by driving the developing particles in an electric field based on the electrostatic latent image. A surface, which faces the developing particles, of the substrate opposed to the substrate for carrying the electrostatic latent image has a surface resistivity in a range of from $1 \times 10^6$ ohm/square ($\Omega/\square$) to $1 \times 10^{12}$ ohm/square ($\Omega/\square$).

(3) Third Reversible Image Display Medium

This reversible image display medium has the following feature: a surface, which faces the developing particles, of at least one of the two substrates in the medium has a surface average median roughness Ra in a range of from 0.2 μm to 0.5 μm.

(4) Fourth Reversible Image Display Medium

This reversible image display medium has the following feature: an external surface of at least the substrate on image observation side among the two substrates has a surface average median roughness Ra in a range of from 0.2 μm to 0.7 μm.

A reversible image display medium having two or more features of the above-mentioned mediums can be employed if no problem is raised.

The foregoing and other objects, features, aspects and advantages of the present invention will become more apparent from the following detailed description and the accompanying drawings.

BRIEF DESCRIPTION OF THE DRAWINGS

FIG. 7(A) is a sectional view of the reversible image display medium before image display. FIG. 7(B) is a sectional view of an example of the medium in image display.

FIG. 8(A) is a sectional view of the reversible image display medium before image display. FIG. 8(B) is a sectional view of an example of the medium in image display.

DESCRIPTION OF THE PREFERRED EMBODIMENTS

Figure 1:
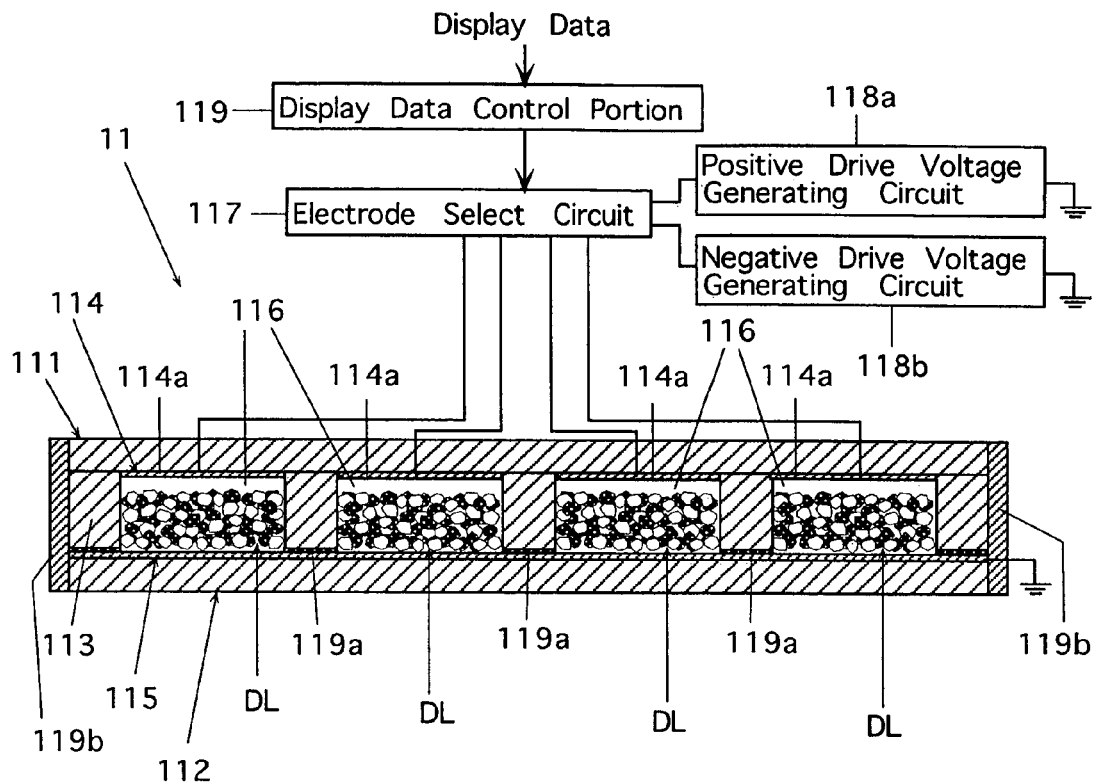
FIG. 1 is a sectional view showing an example of the reversible image display medium having opposite electrodes before image display.

A reversible (in other words, reusable) image display medium according to a preferred embodiment of the invention basically has the following structure.

The reversible image display medium includes two substrates opposed to each other with a predetermined gap therebetween; one or more developer accommodating cells formed between the two substrates, and each having a periphery surrounded by a partition wall; and a dry developer contained in each of the cell(s). The dry developer contains at least two kinds of frictionally chargeable dry developing particles having different chargeable polarities and different optical reflection densities.

According to the reversible image display medium, a predetermined electrostatic field corresponding to an image to be displayed is formed and is applied to the frictionally charged developing particles in the image display medium. Thereby, a Coulomb force acting between the electrostatic field and the charged developing particles can move the developing particles to display the image in predetermined contrast.

After displaying the image, a different electrostatic field, an alternating electric field, an oscillating magnetic field (when magnetic developing particles are employed) or the like may be formed so that the image can be erased. Also, the image can be rewritten by forming a different electrostatic field. Accordingly, it is not necessary to abandon the image display medium, on which the image is already displayed. The developing particles are contained in the cell, and therefore external supply or addition of the developer is not required. Owing to these facts, it is possible to reduce remarkably the use of the image display medium such as paper sheets as well as consumable materials such as developer in the prior art. In contrast to the image formation of the electrophotographic type or the like in the prior art, it is not necessary to melt the toner for fixing it onto a sheet of paper or the like, and a majority of the image forming energy, which is required in such an image forming apparatus in the prior art, is not required.

Owing to the above features, the medium can satisfy a current demand for reduction in environmental loads.

The developer contained in the cell includes at least two kinds of developing particles having different optical reflective densities, and in other words, exhibiting different contrasts or different colors. Further, the developing particles are dry particles, and one kind of the developing particles can appropriately screen or hide the other kind of developing particles. Therefore, image display in good contrast can be achieved.

The developer contained in the cell includes at least two kinds of the chargeable dry developing particles, which can be frictionally charged to have different chargeable polarities. For image display, the developing particles which are mutually reversely charged by the frictional charging are easily moved by the Coulomb force. This also achieves the display in good contrast, and can suppress remaining of the last image, and also allows quick display of images, and further can reduce a drive voltage required for image display.

The dry developing particles can suppress settling and condensation as compared with, e.g., electrophoretic particles in a display liquid used for electrophoretic image display, because the liquid is not present. This also suppress lowering of the contrast of the image display, and thereby can perform stable image display for a long time. Since the settling and condensation of the developing particles are suppressed, the remaining of the last image can be suppressed. As compared with the particles in the liquid, the dry developing particles can perform stable image display also for the reason that the charging performance thereof changes with time to a smaller extent.

As compared with the image display by a conventional CRT display or the like, easy-on-the-eyes image display in high resolution can be performed.

The electrostatic field corresponding to the image to be formed can be formed, for example, by applying a voltage corresponding to the image to be formed between electrodes arranged on the substrates of the image display medium, or by forming an electrostatic latent image on one of the substrates.

The electrostatic field can be formed based on the electrostatic latent image, which is formed on the outer surface of one of the two substrates. In this case, the electrostatic field may be formed simultaneously with formation of the electrostatic latent image, or may be formed after formation of the electrostatic latent image. The electrostatic field may be formed by placing a predetermined potential on the substrate, which is opposite to the substrate for carrying the electrostatic latent image. This predetermined potential can be placed by applying the bias voltage to the above opposite substrate, or grounding the opposite substrate, simultaneously with formation of the electrostatic latent image, or after formation of the electrostatic latent image.

Materials useful for substrates and cell partition walls can be selected from a wide range. Useful substrates include, for example, glass substrates, hard or soft synthetic resin substrates, and soft film substrates.

At least one of the two substrates forming the medium (arranged on the image observation side) is light permeable to allow seeing the displayed image.

In the case of forming an electrostatic latent image for image display on the medium surface, the substrate for carrying the electrostatic latent image can be formed of an insulating substrate. The other substrate on the opposite side (e.g., on the non-observation side) may be an insulating substrate or another kind of substrate. If the other substrate is an insulating substrate and ground potential or a bias voltage must be placed on the other insulating substrate, an electrically conductive film may be formed on the outer surface of the substrate, or the substrate may be entirely made of an electrically conductive material or a material containing an electrically conductive material, although these are not essential. By employing the above manner or structure, the substrate can be easily grounded to carry the ground potential, or the bias voltage can be easily applied to the substrate. An effect of externally shielding the electrical charges by the substrate on the opposite side can be achieved, if the substrate on the opposite side is an insulating substrate, and is provided at its outer surface with the electrically conductive film, or if the substrate itself on the opposite side is the electrically conductive substrate. Thereby, even in the case where the mediums on which images are displayed are overlapped together, collapsing of the images can be suppressed, and thereby the images can be stably held.

When image display is performed by forming an electrostatic latent image, an excessively low surface resistivity of the surface, which faces the developing particles, of the substrate for carrying the electrostatic latent image makes it difficult to hold the latent image on the substrate and causes disturbance of images such as image deletion and image blurring.

Therefore, the developer-facing surface (surface facing the developing particles) of the substrate for carrying the electrostatic latent image may have a surface resistivity of $1 \times 10^{12}$ ohm/square ($\Omega/\square$) or more to retain the latent image in the desired degree which results in display of high quality image. An upper limit of the surface resistivity is not restricted but is presumably approximately $1 \times 10^{16}$ ohm/square ($\Omega/\square$) in view of the substrate commercially available, although not confined thereto.

If the developer-facing surface of the substrate opposed to the substrate for carrying the electrostatic latent has an excessively high surface resistivity in image display by forming the electrostatic latent image, it becomes difficult to conduct electrostatic shielding relating to the substrate when image display mediums are overlapped after image display, or in other words, images become easily affected by charges such as the charges on the medium overlapped, resulting in likelihood of collapsing of images and in difficulty in stably holding the images. Further in this case, it becomes difficult to remove the charges of the electrostatic latent image in erasing or rewriting the images, making it likely to cause remaining of last images. On the other hand, if the developer-facing surface of the substrate opposed to the substrate for carrying the electrostatic latent image has an excessively low surface resistivity, discharge tends to occur between the two substrates, resulting in failure to obtain a uniform electric field for image display and in tendency of giving rise to image irregularity.

The displayed image can be stably held if the surface resistivity in the range of from $1 \times 10^6$ ohm/square ($\Omega/\square$) to $1 \times 10^{12}$ ohm/square ($\Omega/\square$) is shown by the developer-facing surface of the substrate opposed to the substrate for carrying the electrostatic latent image. In this case, remaining of last image and image irregularity are suppressed, and high quality images can be displayed.

Regardless of whether image display is performed based on an electrostatic latent image or not, if the developer-facing surface of the substrate has an excessively low surface roughness, this brings about great van der Waals' forces and thus a high adhesion of particles to the substrate surface, namely difficulty in their separation from the substrate. However, if the developer-facing surface of the substrate has an excessively high surface roughness, the developing particles are fitted into the concavities on the substrate surface and can not easily come out. As described above, if the surface roughness is too low or too high, the adhered developing particles would not easily separate and thus remaining of last images is likely to occur.

To prevent this problem, the surface, which faces the developing particles of at least one of the substrates (especially the substrate on the image observation side) may have a surface average median roughness Ra of 0.2 μm to 0.5 μm which can suppress remaining of last images and can display high quality images.

Irrespectively of whether image display is performed based on an electrostatic latent image, the surface roughness of external surface of the substrate affects the image display as follows. More specifically, if the external surface of the substrate on the image observation side has an excessively low surface roughness, the light quantity of regular reflection (gloss) becomes large when the displayed images are seen and the images can not be clearly seen. If the surface of the substrate has an excessively high surface roughness, the quantity of scattered light is increased when seeing the images and the substrate is reduced in light permeability. Thereby the displayed images become opaque as a whole and suffer a lowered contrast.

In view of this problem, the external surface of at least the substrate on the image observation side, among the substrates forming the medium, may have a surface average median roughness Ra of 0.2 μm to 0.7 μm, resulting, when seen, in controlled light quantity of regular reflection (gloss) and suppressed scattering of light, and in displayed image in good contrast which can be easily seen.

There is no limitation on the number, size, shape, distribution, arrangement (regular or irregular) and others of the developer-accommodating cells insofar as the image is displayed. Optionally a developer-moving suppressing member and a spacer for maintaining a gap between the substrates may be provided between the substrates. The cell partition wall may serve as the developer-moving suppressing member and the spacer.

For example, when an electrostatic latent image is formed on the substrate, an excessively large gap between the substrates or an excessively large thickness of each substrate reduces the electric field applied to the developer between the substrates, and therefore impairs the development performance so that the contrast is lowered. If the gap between the substrates is excessively small, this reduces an amount of the developer, which can be accommodated in the developer accommodating cell, so that required contrast can not be achieved. If the thickness of each substrate is excessively small, and therefore the whole thickness of the medium affected by the thickness of each substrate is excessively small, the medium is liable to be curved so that the gap between the substrates can not be uniform, and the image irregularities are liable to occur. Accordingly, it is preferable that each substrate has a thickness from 5 μm to 100 μm, the gap between the opposite substrates is in a range from 20 μm to 300 μm, and the whole thickness is in a range from 30 μm to 500 μm, although not restricted to these values.

The developing particles may be frictionally charged by applying mechanical vibrations after accommodating the developing particles in the cells, or by frictionally charging at least two kinds of developing particles by stirring and then accommodating the developing particles in the cells. The latter method is preferable to give the developing particles frictionally charged in the desired state. At any rate, the developing particles are frictionally charged before image display.

Such reversible image display medium may have or may not have electrodes. If the substrate is free of electrode, the medium can be so simplified and the use of an elastic substrate such as a film is easily allowed.

Useful reversible image display mediums with electrodes include, for example, those in which an electrode (preferably transparent electrode) is formed on the internal surface of one of substrates which is permeable to light while an electrode opposed to the electrode is formed on the internal surface of the other substrate.

The electrode formed on the internal surface of the other substrate may consist of a group of independent electrodes formed for respective pixels.

The image display medium with the electrodes may be provided with leads for the electrodes. It is desired that the lead is arranged in the non-image display region where the partition wall or the like may be present.

In either of the reversible image display mediums with and without the electrode, the developer accommodated in the developer accommodating cell may contain at least two kinds of dry developing particles, which have mutually different chargeable polarities, and different optical reflective densities (in other words, of different contrasts or different colors). As a typical example, the developer may contain positively chargeable (or negatively chargeable) black particles having light absorbing properties and negatively chargeable (or positively chargeable) white particles having light reflecting properties.

Among at least two kinds of developing particles forming the dry developer, at least one kind of the developing particles may be non-conductive particles. In this case, the presence of such non-conductive particles allows easy and reliable charging by friction of the two kinds of developing particles, regardless of whether the image display medium has the electrodes or not. Thereby, the image display can be further improved.

Of the two kinds of developing particles forming the dry developer, at least one kind of the developing particles may be magnetic particles. The existence of such magnetic particles allows affecting a magnetic stirring force on the developer (developing particles) by the magnetic field (e.g., oscillating magnetic field) in relation to driving the developing particles in the electrostatic field. Owing to the stirring of the developer, the developing particles can easily move in the electrostatic field for image display. Thereby, the contrast is further improved and the required voltage for image display can be further lowered.

In other words, regardless of whether the image display medium has the electrodes or not, the existence of such magnetic particles allows stirring the developer (developing particles) by the magnetic field (e.g., oscillating magnetic field). Owing to the stirring of the developer, the developing particles can easily move when initializing the medium or erasing the last image, or displaying the new image in the electrostatic field for image display. Thereby, the image display is further improved.

The developing particles may be stirred by applying AC voltage or like alternating voltage and/or applying mechanical vibrations. Optionally the stirring may be done using a combination of two or more stirring means such as alternating voltage agitation, magnetic agitation, mechanical agitation, ultrasonic wave emission and the like.

One kind of the developing particles may be nonconductive and magnetic particles.

In any one of the foregoing cases, if the developing particles are excessively small, they have an excessively large adhesiveness, and therefore cause mutual adhesion of the particles and reduction in developing efficiency. Further, such excessively small developing particles carry a large amount of charges so that a large electric field is required for moving the particles for image display, and therefore, a high drive voltage is required.

If the developing particles are excessively large, the frictional charging can not be performed in an intended manner so that the developing particle moving speed can not be increased sufficiently in the electrostatic field for image display, and/or good contrast can not be achieved.

In view of the above as well as the material and others for obtaining the predetermined characteristics of the developing particles, the appropriate particle diameter(volume average particle diameter) of the non-conductive developing particle is in a range from 1 μm to 50 μm, and the appropriate particle diameter(volume average particle diameter) of the magnetic developing particle is in a range from 1 μm to 100 μm.

The developing particles can be formed, for example, from a binder resin and a coloring agent, etc. or with a coloring agent alone, etc. Those which are usable are described below.

Binder Resin

The binder resin is not specifically limited in so far as it can disperse a coloring agent, magnetic substance, etc. and is usable usually as a binding agent. Binding resins which are usable for electrophotography toner are used as a representative example.

Examples of useful binder resins are polystyrene type resins, poly(meth)acrylic type resins, polyolefin type resins, polyamide type resins, polycarbonate type resins, polyether type resins, polysulfone type resins, polyester type resins, epoxy resins, urea resins, urethane resins, fluorine-containing resins, silicone resins and copolymers, block polymers, graft-polymers and polymer blend, etc. of these resins.

The binder resin may have a considerably high glass transition temperature (Tg) and need not be a thermoplastic resin.

Coloring Agents

As the coloring agents, the following various kinds of organic or inorganic pigments and dyestuffs having various colors are usable.

Examples of black pigments are carbon black, copper oxide, manganese dioxide, Aniline Black and activated carbon, etc.

Examples of yellow pigments are chrome yellow, zinc yellow, cadmium yellow, yellow iron oxide, mineral Fast Yellow, Nickel Titanium Yellow, Naphthol Yellow S, Hansa Yellow G, Hansa Yellow 10G, Benzidine Yellow G, Benzidine Yellow GR, Quinoline Yellow Lake, Permanent Yellow NCG and Tartrazine Lake, etc.

Examples of orange pigments are red chrome yellow, molybdenum orange, Permanent Orange GTR, Pyrazolone Orange, Vulcan Orange, Indanthrene Brilliant Orange RK, Benzidine Orange G and Indanthrene Brilliant Orange GK, etc.

Examples of red pigments are red iron oxide, cadmium red, red lead, mercury sulfide, Permanent Red 4R, Lithol Red, Pyrazolone Red, Watchung Red, Lake Red D, Brilliant Carmine 6B, eosine lake, Rhodamine Lake B, alizarin lake and Brilliant Carmine 3B, etc.

Examples of violet pigments are manganese violet, Fast Violet B and Methyl Violet Lake, etc.

Examples of blue pigments are prussian blue, cobalt blue, Alkali Blue Lake, Victoria Blue Lake, Phthalocyanine Blue, Phthalocyanine Blue containing no metal, partially chlorinated Phthalocyanine Blue, Fast Sky Blue and Indanthrene Blue BC, etc.

Examples of green pigments are chrome green, chromium oxide, Pigment Green B, Malachite Green Lake and Final Yellow Green G, etc.

Examples of white pigments are zinc white, titanium oxide, antimony white and zinc sulfide, etc.

Examples of extender pigments are barite powder, barium carbonate, clay, silica, white carbon, talc and alumina white, etc.

Examples of various kinds of dyestuffs such as basic, acid, disperse and substantive dye are Nigrosine, Methylene Blue, Rose Bengale, Quinoline Yellow and Ultramarine Blue, etc.

These coloring agents are usable alone or in combination of plural of them.

Especially in white-black display, carbon black is preferable as a black coloring agent and titanium dioxide as a white coloring agent.

Especially in the case of preparing developing particles from a mixture of a white pigment and a meltable binding resin(binder resin), it is preferable to use the white pigment in an amount of at least 10 parts by weight, more preferably at least 20 parts by weight, per 100 parts by weight of raw monomer of white particles, in order to obtain sufficient whiteness. It is desirable to use the white pigment in an amount of up to 60 parts by weight, more preferably up to 50 parts by weight, in order to secure sufficient dispersibility of the white pigment. Over 60 parts by weight of the white pigment, the binding of the pigment and the binding resin will decrease and the dispersion of the pigment will deteriorate. Less than 10 parts by weight of the white pigment, the developing particles having a different color will not sufficiently be shaded by the pigment.

Although carbon black is preferable as the black coloring agent, it is possible to use magnetic particles or magnetic fine powder such as magnetite, ferrite, etc. as the coloring agent in order to provide magnetic character to the developing particles.

Other Additives

Examples of additives preferably usable other than the above binder resin or coloring agent are magnetic substance, charge-controlling agent, resistance adjusting agent, etc.

Charge-Controlling Agent

The charge-controlling agent is not specifically limited in so far as it provides a charge to the developing particles by friction-charging.

Examples of plus-charge-controlling agents are Nigrosine dye, triphenylmethane compound, quaternary ammonium salt compound, polyamine resin, imidazole derivative, etc.

Examples of minus-charge-controlling agents are salicylic acid-metal complex, metal-containing azo dye, metal-containing oil-soluble dye (including metal ion or metal atom), quaternary ammonium salt compound, calixarene compound, boron-containing compound (benzilic acid-boron complex), nitroimidazole derivative, etc.

Other than the above, as charge-controlling agents are usable metal oxides such as ultrafine silica particles, ultrafine titanium oxide particles, ultrafine alumina particles, etc., nitrogen-containing cyclic compounds such as pyridine or its derivative, salt, various organic pigments, resins containing fluorine, chlorine, nitrogen, etc.

Magnetic Substances

Magnetic particles and magnetic fine powder are usable. Examples of these substances are ferromagnetic elements, alloy or compounds containing the element. Examples thereof are those containing a conventionally known magnetic substance such as magnetite, hematite, ferrite or like alloys or compounds of iron, cobalt, nickel, manganese, etc., other ferromagnetic alloy, etc. The magnetic powder may have various shapes such as particle, needle, thin flat shape, etc. and is suitably usable.

Resistance Adjusting Agent

Resistance adjusting agents include similar compounds to the above magnetic powder and coloring agent.

Examples of resistance adjusting agents are metal oxides, graphite, carbon black, etc. having various shapes such as thin flat, fibrous or powder shape, etc.

Below is explained an example of preparing developing particles.

Prescribed amount of each of components selected from the above binder resin, magnetic powder, coloring agent, charge-controlling agent, resistance adjusting agent and other additives is prepared, and those components are mixed thoroughly. The mixture is further mixed with heating by use of press-kneader, twin-screw mixing device, etc. After cooling, the mixture is roughly pulverized with use of hammer mill, cutter mill, etc. and then finely pulverized with use of jet mill, angmill, etc. The resulting powder is classified by a wind classifier, etc. to a predetermined average particle size to obtain developing particles.

A developer having a predetermined amount of charges is obtained by mixing and stirring thus obtained particles having different chargeable polarities and contrasts(optical reflective densities) at a predetermined rate thereof. A third agent such as fluidization agent may be added thereto to improve fluidity of the developer.

Fluidization Agent

Examples of fluidity improving agents are silica, alumina, titanium oxide, barium titanate, magnesium titanate, calcium titanate, strontium titanate, zinc oxide, siliceous sand, clay, mica, wallastonite, diatomaceous earth, chromium oxide, cerium oxide, red iron oxide, antimony trioxide, magnesium oxide, zirconium oxide, barium sulfate, barium carbonate, calcium carbonate, silicon carbide, silicon nitride, etc.

Particularly preferable are fine powder of silica, aluminum oxide, titanium dioxide and magnesium fluoride. The fluidity improving agent is used either alone or in combination.

In the image display employing the reversible image display medium, the electrostatic field to be applied to the developing particles can be formed, for example, based on the electrostatic latent image, which is formed on, or brought close to or into contact with, e.g., the surface of one (e.g., on the image observation side) of the two substrates in accordance with the image to be displayed. The formation of the electrostatic field may be performed simultaneously with or after the formation or approach of the electrostatic latent image. The formation of the electrostatic field is performed, e.g., by placing a predetermined potential, which is required for forming the electrostatic field, on the substrate opposite to the substrate, on which the electrostatic latent image is to be formed. The above predetermined potential can be placed by applying a bias to the opposite substrate, or by grounding the opposite substrate.

The electrostatic latent image may be formed directly on the medium surface (substrate surface), e.g., by a device for directly forming the electrostatic latent image, or may be formed by transferring the electrostatic latent image, which is formed outside the medium by an external electrostatic latent image forming device, onto the medium surface (substrate surface). The electrostatic latent image, which is formed outside the medium by an external electrostatic latent image forming device, may be brought close to or into contact with the medium surface (substrate surface).

The direct electrostatic latent image forming device may be of various discharging types, in which the electrostatic latent image charges are placed by performing the discharge to the medium surface in accordance with the image to be displayed, or of various charge injection types, in which the electrostatic latent image charges are placed by injecting charges to the medium surface in accordance with the image to be displayed. For example, the devices of the former type may be of an ion flow type, and also may be of a multi-stylus type having an electrostatic record head, in which recording electrodes are arranged in a predetermined direction (e.g., main scanning direction for substrate scanning by the device). In an example of the latter type, the device of the multi-stylus type may be used, which includes an electrostatic record head, in which the recording electrodes are arranged in a predetermined direction (e.g., main scanning direction for substrate scanning by the device), and neighboring control electrodes are arranged close to the recording electrodes.

The external electrostatic latent image forming device may be configured such that the electrostatic latent image corresponding to the image to be displayed is formed on the electrostatic latent image carrier, and then is transferred onto, or brought close to or into contact with the substrate surface. More specifically, the electrostatic latent image corresponding to the image to be displayed may be formed, e.g., on a photoconductive member such as a photosensitive member, and may be transferred onto, or brought close to or into contact with the substrate surface. Alternatively, the electrostatic latent image corresponding to the image to be displayed may be formed on a dielectric member, and may be transferred onto, or brought close to or into contact with the substrate surface.

The image display may be performed with the electric field forming device including one of the foregoing electrostatic latent image forming devices.

By forming the electrostatic latent image on the image display medium in the foregoing transfer manner or the direct formation manner or by bringing the electrostatic latent image close to or into contact with the image display medium, the image holding properties of the medium can be improved. In particular, the image holding properties can be improved in the case of using developer having high flowability or developer having flowability which can be increased by the developer stirring operation prior to the image display.

In the reversible image display medium having the opposite electrodes, the electrostatic field for the image display can be formed by applying a voltage across the opposite electrodes. The electrostatic field formation device for such medium will be described later.

In the reversible image display medium without an electrode or with an electrode on only one of the substrates, the electrostatic field to be applied to the developing particles can be formed, for example, by arranging an electrode or electrodes on the outer surface(s) of the medium and applying a voltage through the electrode(s).

In both the reversible image display mediums with and without the electrode, image erasing processing may be performed for erasing the previously displayed image prior to the new image display.

The image erasing processing can be performed, e.g., by forming an electric field, which can move the developing particles forming the developer in the image display medium, and/or applying a stirring force to the developer. The application of the stirring force can be performed, e.g., by forming an alternating electric field, forming an oscillating magnetic field, emitting ultrasonic waves, and/or applying mechanical vibrations.

For the image display, therefore, various kinds of image easing devices can be appropriately employed. Such image erasing devices may include the electric field forming device for forming the electric field moving the developing particles, the stirring device for applying a stirring force to the developing particles, or both the electric field forming device and the stirring device.

For example, under the electric field, one kind of the developing particles, which have the same optical reflection density (i.e., the same contrast or the same color), among the two kinds of developing particles described above may be collected to one of the substrates, and the other kind of developing particles having the same optical reflection density may be collected to the other substrate. Thereby, the image erasure can be performed. Further, the next image formation can be performed by moving the developing particles on only the image portion so that the image display can be performed smoothly and reliably in high quality.

For example, in the operation of stirring the developer (developing particles), the image is erased, and the amount of charges and the flowability of the developing particles are improved. Thereby, the next image formation can be performed smoothly and reliably in a high quality.

The electric field forming device for image erasing may include a pair of electrodes (usually made of metal) or dielectric members, which are arranged on the opposite sides of the reversible image display medium, and a power supply device for applying a bias voltage across these electrodes or dielectric members.

In addition to the above, it is possible to employ various kinds of electric field forming devices of the discharging type, in which the electric field is formed by performing the discharging to the image display medium, and various kinds of electric field forming devices of the charge injection type, in which the electric field is formed by injecting the electric charges to the reversible image display medium. The devices of the former type may be specifically are a Corona charging device, an electric field forming device of an ion flow type, and an electric field forming device of the multi-stylus type having a head, in which electrodes are arranged in a predetermined direction. The device of a latter type may be specifically an electric field forming device of the multi-stylus type, in which electrodes are arranged in a predetermined direction, and neighboring control electrodes are arranged close to the electrodes.

The stirring device may be configured as follows:

Thus, the stirring device may be configured to form an alternating electric field applied to the reversible image display medium.

This device can be utilized if at least one kind of developing particles have the electrically insulating property.

Also, the stirring device may be configured to form an oscillating magnetic field applied to the reversible image display medium.

This device can be utilized if at least one kind of developing particles contain a magnetic material.

Further, the stirring device may be configured to emit ultrasonic waves to the reversible image display medium.

The stirring device may be configured to apply mechanical vibrations to the reversible image display medium.

The stirring device may be formed of a combination of the foregoing two or more structures.

The alternating electric field applying device and the oscillating magnetic field applying device can efficiently stir the developer.

As already described, the stirring of the developer (developing particles) improves the amount of charges and the flowability of the developing particles, and thereby can achieve smooth and reliable image display with high quality.

By stirring the developer prior to the image display, the amount of charges of the developing particles is stabilized. This likewise achieves good image display. Further, the allowable ranges of the chargeability and flowability of the developer can be widened.

For the image display using the reversible image display medium either with or without the electrode, the developer may be stirred also for the purpose of performing the foregoing image erasing processing, or independently of the image erasing processing.

When using the image display medium without an electrode or with an electrode on only one of the substrates, for example, the electrostatic latent image corresponding to the image to be displayed may be formed, e.g., on the surface (substrate surface) of the image display medium, and the electrostatic field may be formed based on the electrostatic latent image simultaneously with or after the formation of the electrostatic latent image, and the developer may be stirred, for example, simultaneously with and/or before formation of the electrostatic field.

For the image display medium provided with the opposite electrodes, a voltage may be applied across the opposite electrodes to form the electrostatic field, and the developer may be stirred before or simultaneously with the formation of the electrostatic field.

Regardless of whether the electrode is employed or not, the developer can be stirred, e.g., by a stirring device, which is opposed to an image display medium transporting path, and is located in or upstream to the region for forming the electrostatic field by the electric field formation device in the relative transporting direction of the image display medium with respect to the electric field formation device.

The developer stirring device and method may be the same as or similar to those already exemplified in connection with the image erasing processing.

By stirring the developer for the image display, the contrast can be further improved, and the drive voltage can be further lowered.

For the image display employing the reversible image display medium, the electrostatic latent image may be formed on the surface (substrate surface) of the image display medium in such a manner that the medium surface is uniformly charged to carry the predetermined potential before formation of the electrostatic latent image, and the electrostatic latent image in accordance with the image to be displayed is formed on the charged region. Based on the electrostatic latent image, the predetermined electrostatic field is formed in accordance with the image to be displayed. Thereby, the developing particles may be moved for the image display.

The formation of electrostatic latent image on the medium can be performed, e.g., by directly forming it on the medium surface charged in the charging step, or by transferring the electrostatic latent image formed on the electrostatic latent image carrier outside the medium onto the medium surface charged in the charging step.

The region of the electrostatic latent image formed on the medium may have such charging characteristics that the region is charged to carry the same polarity as or the polarity different from the charged polarity of the region of the medium surface, which is uniformly charged prior to the electrostatic latent image formation, or that the region of the latent image is charged to 0 V.

According to the above manner, in which the electrostatic latent image is written onto the charged region formed by uniformly charging the surface of the image display medium to carry the uniform potential, the charged developing particles in the developer accommodating cell(s) can be moved. Further, such an electrostatic field, which is enough to hold the moved developing particles is formed. In other words, after uniformly charging the surface of the image display medium to carry the predetermined potential, the electrostatic latent image is written onto the charged region, whereby the image holding properties are improved. Particularly, in the case of using the developer having high flowability or the developer having the flowability which can be increased by the developer stirring operation prior to the image display, the advantages relating to the image holding can be achieved. Owing to the above, images of good contrast and high quality can be stably displayed for a long time.

According to the various reversible image display mediums described above, the images of good contrast, high resolution and high quality can be stably displayed for a long time. Further, remaining of last images can be suppressed, and therefore good reversibility can be achieved. These improve the quality of the displayed image. The image display can be quickly performed with lower drive voltage. The image display can be performed with fewer irregularities.

Specific examples of the reversible image display medium, image display method and image forming apparatus will now be described below with reference to the drawings.

<Reversible Image Display Medium>

Reversible Image Display Medium 11

Figure 2:
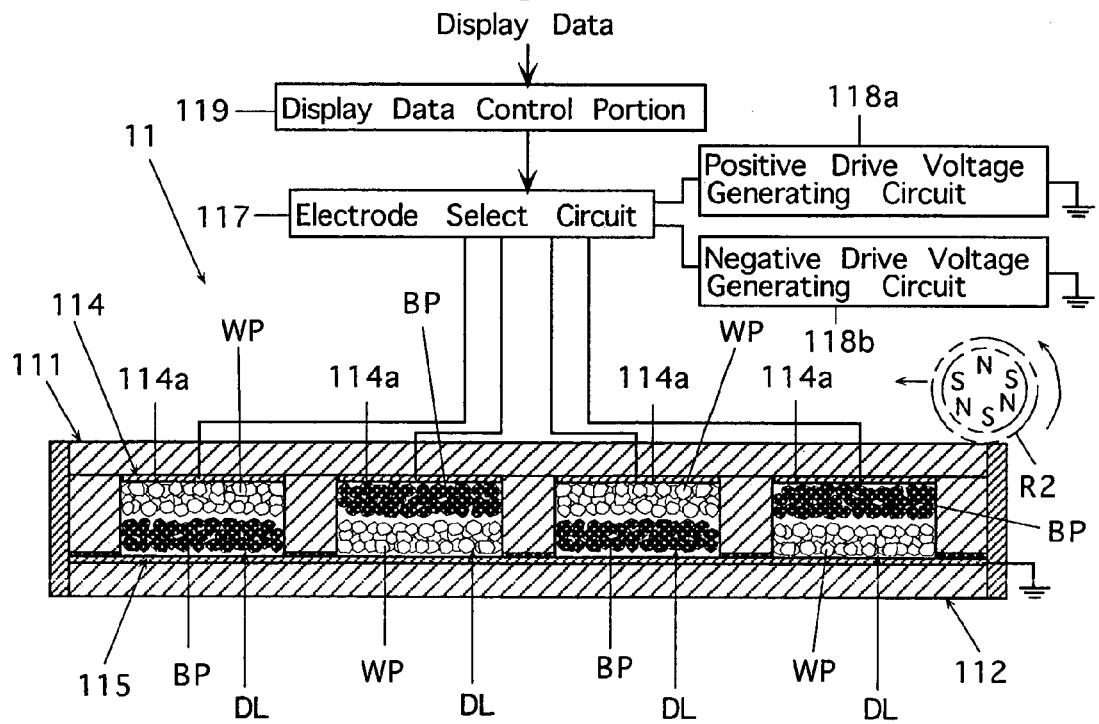
FIG. 2 is a sectional view of the medium shown in FIG. 1 on which images are displayed.

FIGS. 1 and 2 show an example of the reversible image display medium. A medium 11 shown in FIGS. 1 and 2 includes first and second substrates 111 and 112. These substrates. 111 and 112 are opposed to each other with a predetermined gap therebetween. A partition member 113 is arranged between the substrates 111 and 112 for keeping a predetermined gap between the substrates. The partition member 113 serves also as a spacer between the substrates 111 and 112. The partition member 113 couples and fixes the substrates 111 and 112 together.

The first substrate 111 is formed of a light-transparent plate such as a glass plate, a transparent resin film or the like. The substrate 111 is located on the image observation side.

The external surface of the substrate 111 on the image observation side has a surface average median roughness Ra of 0.2 μm to 0.7 μm.

Figure 3:
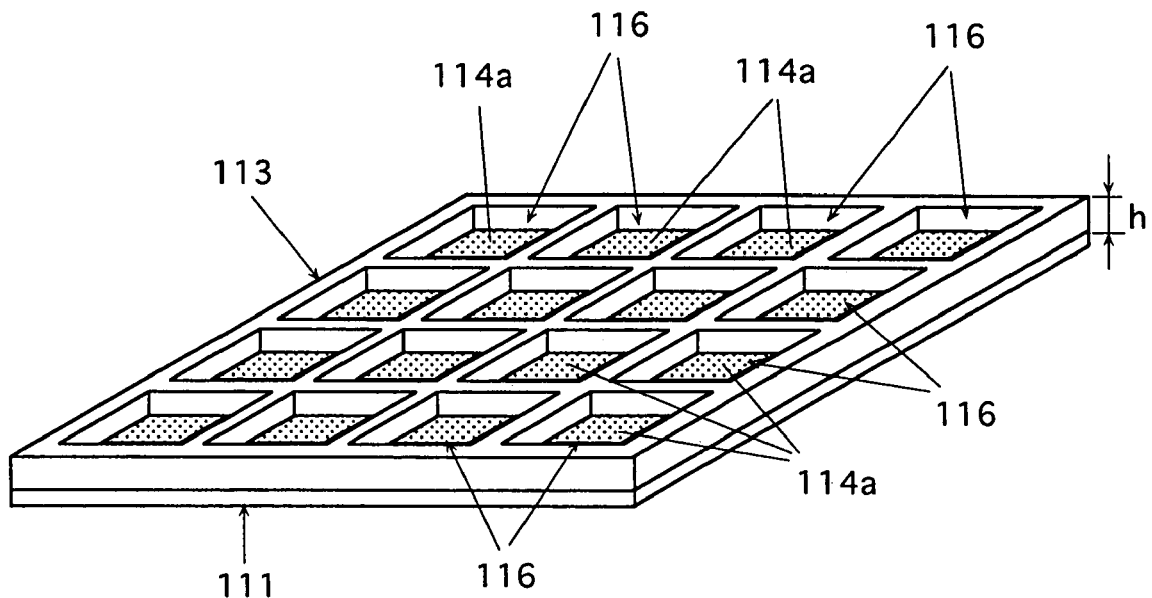
FIG. 3 is a perspective view showing a first substrate and a grid-like partition member formed thereon in the medium shown in FIG. 1.

The partition member 113 is also a group of partition walls forming developer accommodating cells (see FIG. 3). The partition member 113 is arranged on the inner surface of the first substrate 111 and has a grid-like form as shown in FIG. 3. Thereby, the partition member 113 defines a plurality of developer accommodating cells 116, each of which has a square form and is surrounded by a portion of the partition member 113. The partition wall has a width(thickness) α and a height h, and is spaced by a distance of pt from the neighboring wall.

A first electrode 114 is a transparent electrode, and formed on the inner surface of the first substrate 111 opposed to the second substrate 112. The first electrode 114 includes a plurality of independent electrodes 114a arranged in a grid-like form. Each of the independent electrodes 114a is transparent and made of, e.g., indium tin oxide (ITO). The independent electrodes 114a are arranged in cells 116, respectively, with a distance between the neighboring independent electrodes, which is substantially identical with the partition wall thickness α. Thus one cell corresponds to one pixel.

The second substrate 112 is not essentially required to be transparent, but is formed of a light-transparent plate such as a glass plate, a resin film or the like in this embodiment.

The second substrate 112 is provided at its inner surface opposed to the first substrate 111 with a second electrode 115. The second electrode 115 in this example extends continuously throughout an image display region of the inner surface of the substrate. The second electrode 115 is not essentially required to be transparent, but may be formed of, e.g., transparent ITO.

Each cell accommodates the dry developer DL including the white and black developing particles WP and BP, which are mutually and frictionally charged.

Each cell is sealed so that the developer DL does not leak from the cell.

Figure 4:
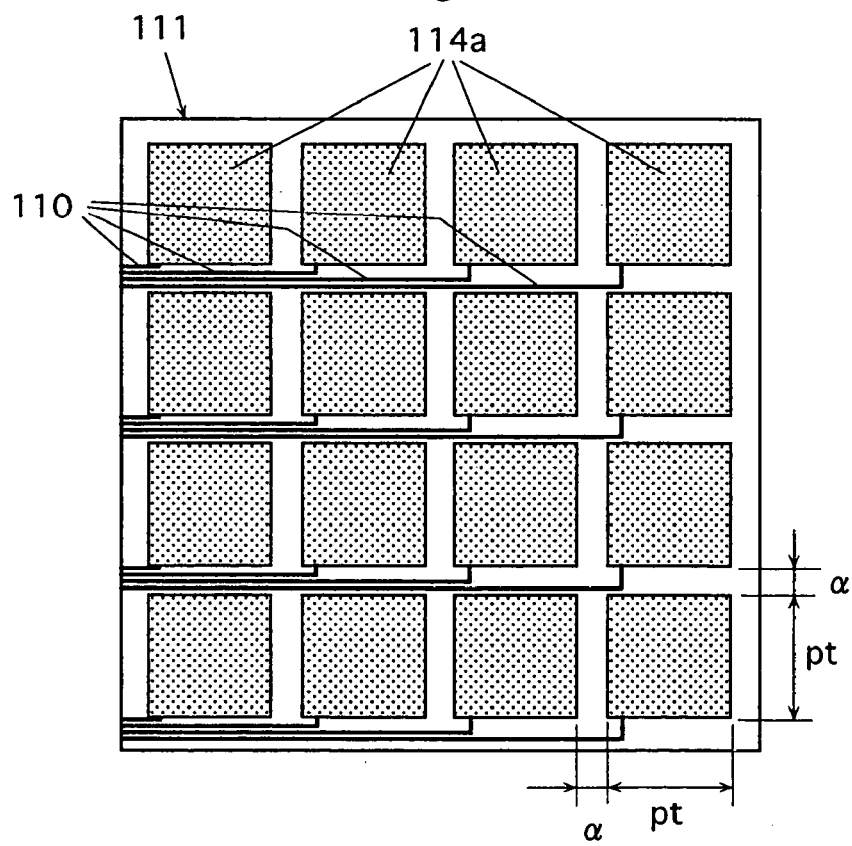
FIG. 4 is a plan view showing the first substrate and independent electrodes formed thereon in the medium shown in FIG. 1.

The independent electrode 114a forming the second electrode 114 in the image display medium. 11 is connected to or provided with a lead portion 110 as shown in FIG. 4, and is connected to an electrode select circuit 117 through the lead portion as shown in FIG. 1. The electrode select circuit 117 is connected to a positive drive voltage generating circuit 118a, a negative drive voltage generating circuit 118b and a display data control portion 119. Each independent electrode 114a is independently supplied with a drive voltage from the electrode select circuit 117. The display data control portion 119 receives display data from display data output means (not shown) such as a computer, a word processor, a facsimile machine or the like, and controls the electrode select circuit 117 based on the supplied data. In other words, these electrode select circuit and others form an example of the electric field forming device or the image forming apparatus for the reversible image display medium provided with the electrodes.

Figure 5:
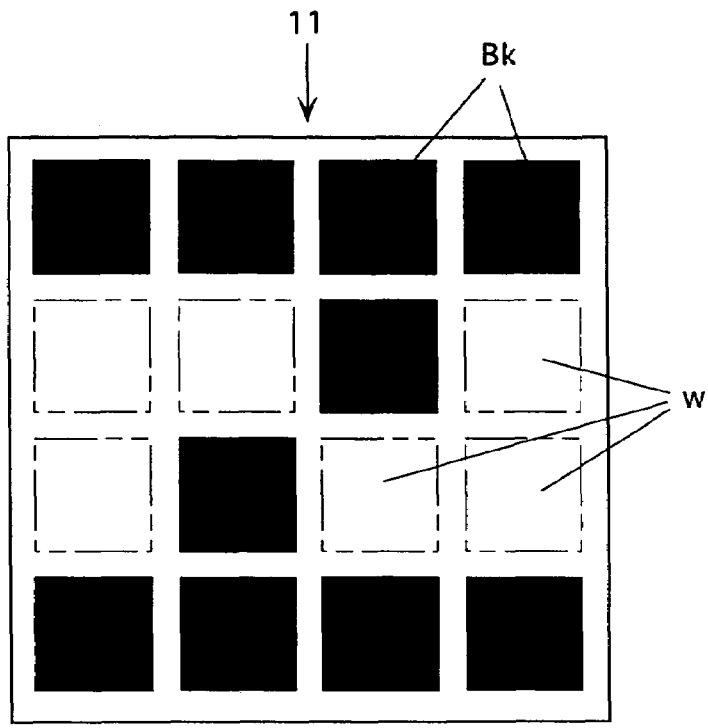
FIG. 5 is a view showing an example of the image display on the medium shown in FIG. 1.

For example, the second electrode 115 in the image display medium 11 is grounded, or a bias voltage is applied from a bias source (not shown) to the electrode 115, if necessary, and the positive or negative drive voltage generating circuit 118a or 118b applies the predetermined voltage across the electrode 115 and each independent electrode 114a via the electrode select circuit 117, which is controlled to perform the desired image display by the display data control portion 119. Thereby, the predetermined electric field is formed for each pixel so that the developing particles WP and BP, which are mixed in the developer DL as shown in FIG. 1, move in accordance with the respective electric fields as shown in FIG. 2. In this manner, the image can be displayed in predetermined contrast. For example., image display can be performed as shown in FIG. 5. In FIG. 5, Bk indicates a portion displayed in black, W indicates a portion displayed in white.

A roller R2 shown with a chain line in FIG. 2 will be described later.

Reversible Image Display Mediums 12, 12'

Figure 6A:
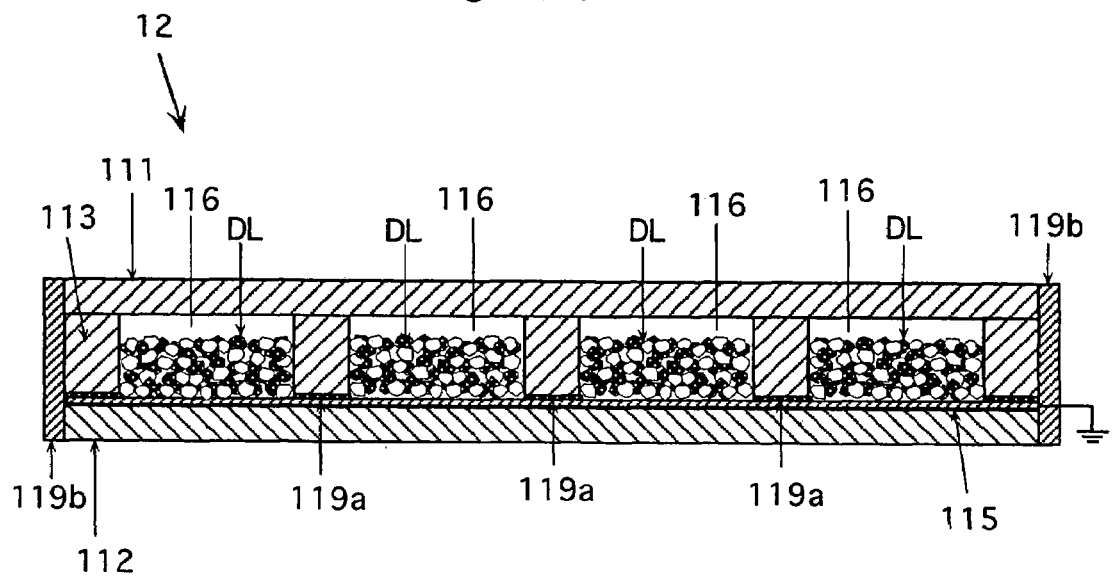
FIG. 6(A) is a sectional view showing another example of the reversible image display medium.
Figure 6B:
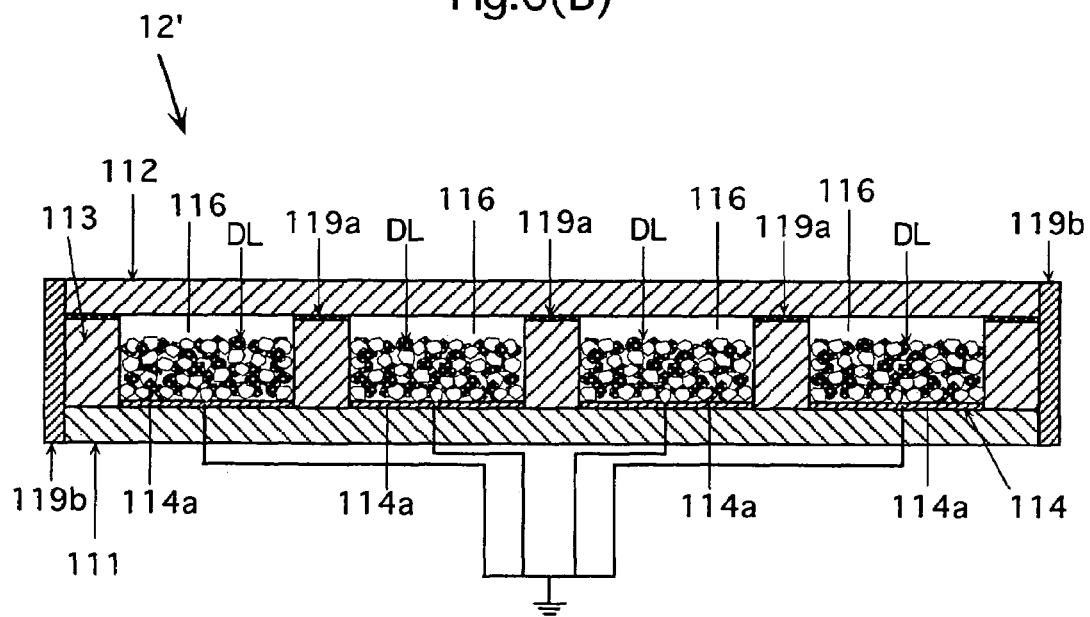
FIG. 6(B) is a sectional view showing a further example of the reversible image display medium.

FIG. 6(A) and FIG. 6(B) show other examples of the reversible image display medium.

The reversible image display medium 12 shown in FIG. 6(A) is identical with the medium 11 of FIG. 1 if the medium 11 is such that at least the first substrate 111 is formed of a material having a light transmitting property and an insulating property and that the independent electrodes 114a are not provided.

The developer-facing internal surface (internal surface, facing the developing particles) of the substrate 111 on the image observation side has a surface resistivity of at least $1 \times 10^{12}$ ohm/square and a surface average median roughness Ra of 0.2 μm to 0.5 μm.

The external surface of the substrate 111 on the image observation side has a surface average median roughness Ra of 0.2 μm to 0.7 μm.

The medium 12 is identical in other respects with the medium 11 of FIG. 1. In FIG. 6(A), the same components and parts as in the medium 11 are indicated with the same reference symbols.

The reversible image display medium 12' shown in FIG. 6(B) is identical with the medium 11 of FIG. 1 if the medium 11 is such that at least the second substrate 112 is formed of a material having a light transmitting property and an insulating property and that the electrode 115 is not provided. The medium 12' has the substrate 112 on the image observation side.

The internal surface, which faces the developer DL, of the substrate 112 on the image observation side has a surface resistivity of at least $1 \times 10^{12}$ ohm/square and a surface average median roughness Ra of 0.2 μm to 0.5 μm.

The external surface of the substrate 112 on the image observation side has a surface average median roughness Ra of 0.2 μm to 0.7 μm.

The medium 12' is identical in other respects with the medium 11 of FIG. 1. In FIG. 6(B), the same components and parts as the medium 11 are indicated with the same reference symbols.

In the medium 12 (or the medium 12'), for example, the electrode 115 of the second substrate 112 (electrodes 114a in the medium 12') is (are) grounded. In addition, for example, over the external surface of the first substrate 111 (second substrate 112 in the medium 12'), a) an electrode or electrodes are provided to selectively apply a voltage corresponding to the image to be formed between the electrode(s) and the ground electrode(s), b) an electrostatic latent image corresponding to the image to be formed is directly formed, or c) an image carrier carrying the electrostatic latent image corresponding to the image to be formed is contacted (or made to come close), whereby the electric field for driving the developing particles is applied to the developer DL, whereby an image can be displayed.

The electrode 115 of the medium 12 and the electrodes 114a of the medium 12' may be electrode(s) having an intermediate resistance value.

Reversible Image Display Medium 13

Figure 7A:
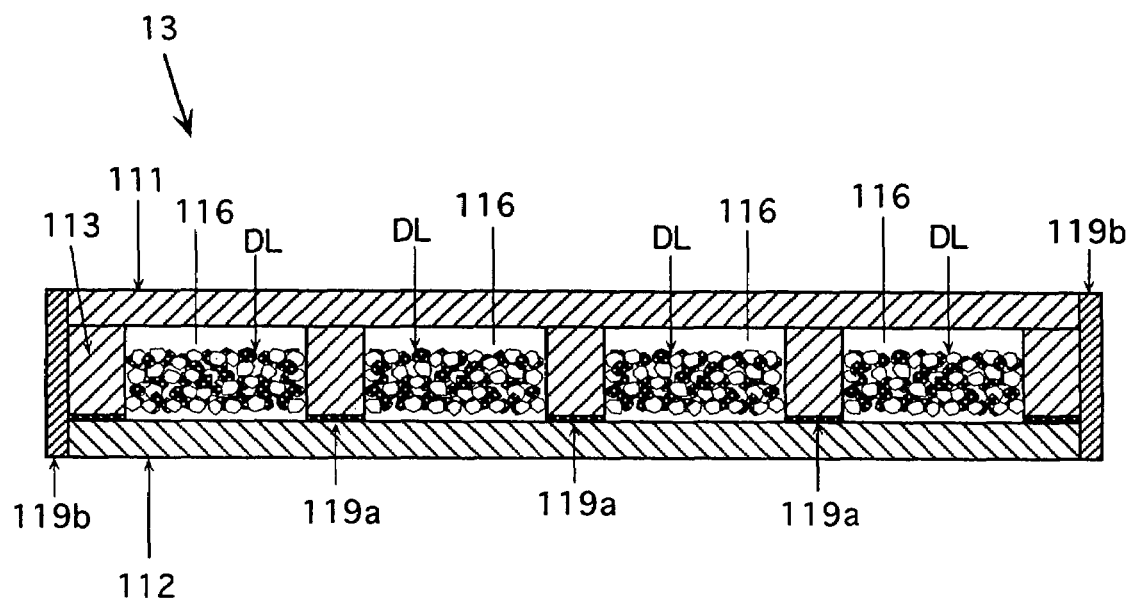
FIG. 7(A) and FIG. 7(B) show other example of the reversible image display medium.

FIG. 7(A) shows another example of the reversible image display medium.

The reversible image display medium 13 shown in FIG. 7(A) is identical with the medium 11 of FIG. 1 if the medium 11 is such that at least the first substrate 111 is formed of a material having a light transmitting property and an insulating property and that the first substrate electrode 114 and the second substrate electrode 115 are not provided.

The developer-facing internal surface of the substrate 111 on the image observation side has a surface resistivity of at least $1 \times 10^{12}$ ohm/square and the developer-facing internal surface of the substrate 112 on the opposed side has a surface resistivity of $1 \times 10^{6}$ ohm/square to $1 \times 10^{12}$ ohm/square.

The developer-facing internal surface of at least the substrate 111 among the substrates 111, 112 has a surface average median roughness Ra of 0.2 μm to 0.5 μm.

The external surface of the substrate 111 on the image observation side has a surface average median roughness Ra of 0.2 μm to 0.7 μm.

The medium 13 is identical in other respects with the medium 11 of FIG. 1. In FIG. 7(A), the same components and parts as in the medium 11 are indicated with the same reference symbols.

Reversible Image Display Medium 14

Figure 8A:
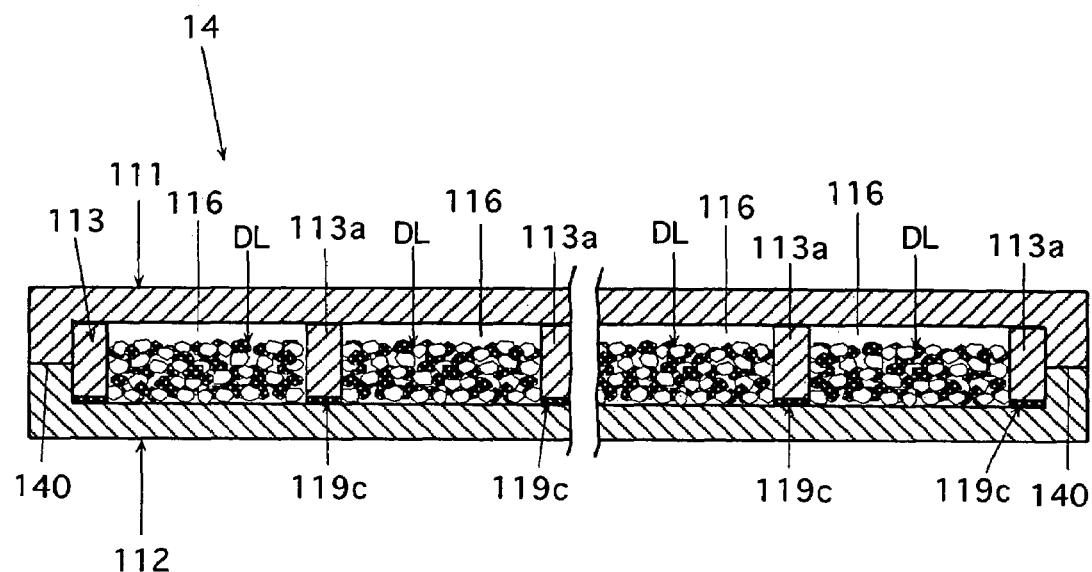
FIG. 8(A) and FIG. 8(B) show further example of the reversible image display medium.

FIG. 8(A) shows a further example of the reversible image display medium.

Figure 9:
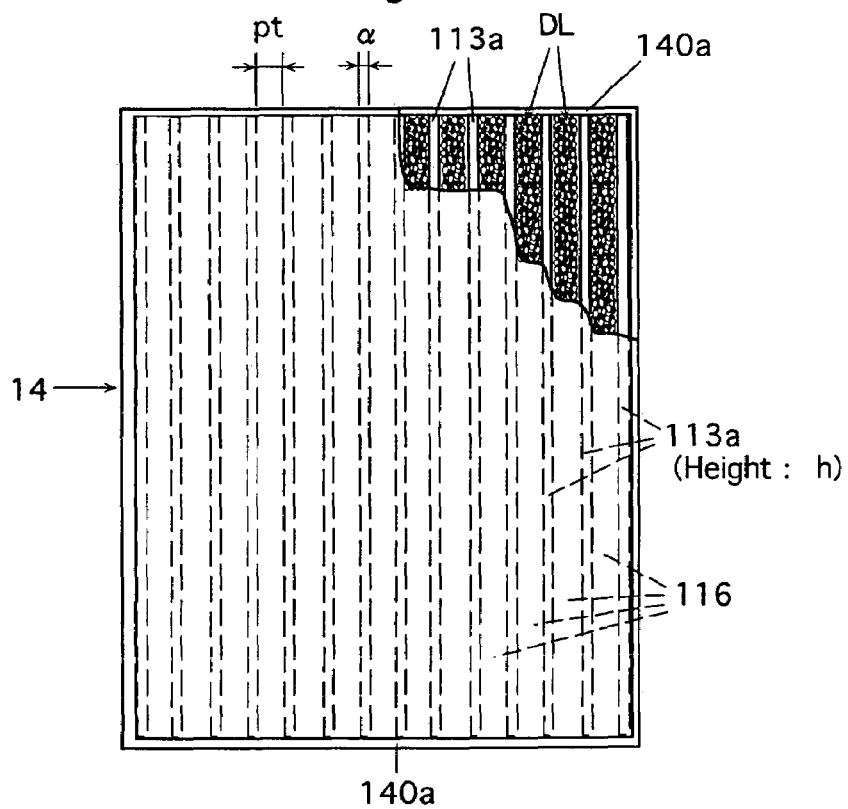
FIG. 9 is a plan view showing the medium shown in FIG. 8(A) and FIG. 8(B) as partly cut away.

The reversible image display medium 14 shown in FIG. 8(A) is identical with the medium 11 of FIG. 1 if the medium 11 is such that at least the first substrate 111 is formed of a material having a light transmitting property and an insulating property, that the first substrate electrode 114 and the second substrate electrode 115 are not provided, and that a partition member 113 is provided which consists of a plurality of partition walls 113a extending in parallel with the lengthwise side of the medium 14 instead of the grid-like partition member (see FIG. 9). The developer-accommodating cell 116 is provided between the neighboring partition walls 113a. Each cell 116 accommodates the developer DL containing mutually frictionally charged white developing particles WP and black developing particles BP.

In the periphery of the medium 14, the two substrates 111, 112 are heat-sealed to form a sealing portion 140. The part 140a of the sealing portion 140 is provided at the both ends of the longitudinal partition walls 113a extending in the lengthwise direction, and serves also as the partition wall forming the cell 116.

As shown in FIG. 9, the partition walls 113a are formed with a width α, a height h and a space pt between the adjacent partition walls 113a.

In respect of the medium 14, the internal surface of the substrate 111 on the image observation side, which faces the developer DL, has a surface resistivity of at least $1 \times 10^{12}$ ohm/square and the internal surface of the substrate 112 on the opposed side, which faces the developer DL, has a surface resistivity of $1 \times 10^6$ ohm/square to $1 \times 10^{12}$ ohm/square.

The internal surface of at least the substrate 111 among the substrates 111, 112, which faces the developer DL, has a surface average median roughness Ra of 0.2 μm to 0.5 μm.

The external surface of the substrate 111 on the image observation side has a surface average median roughness Ra of 0.2 μm to 0.7 μm.

In the mediums 13, 14, for example, a) an electrostatic latent image corresponding to the image to be formed is directly formed on the first substrate 111, or b) an image carrier carrying the electrostatic latent image corresponding to the image to be formed is contacted with (or made close to) the first substrate 111. Thereby an image can be displayed by applying to the developer DL an electric field for driving the developing particles. The second substrate 112 may be set to a ground potential, if necessary.

Reversible Image Display Mediums 15, 15'

Figure 10A:
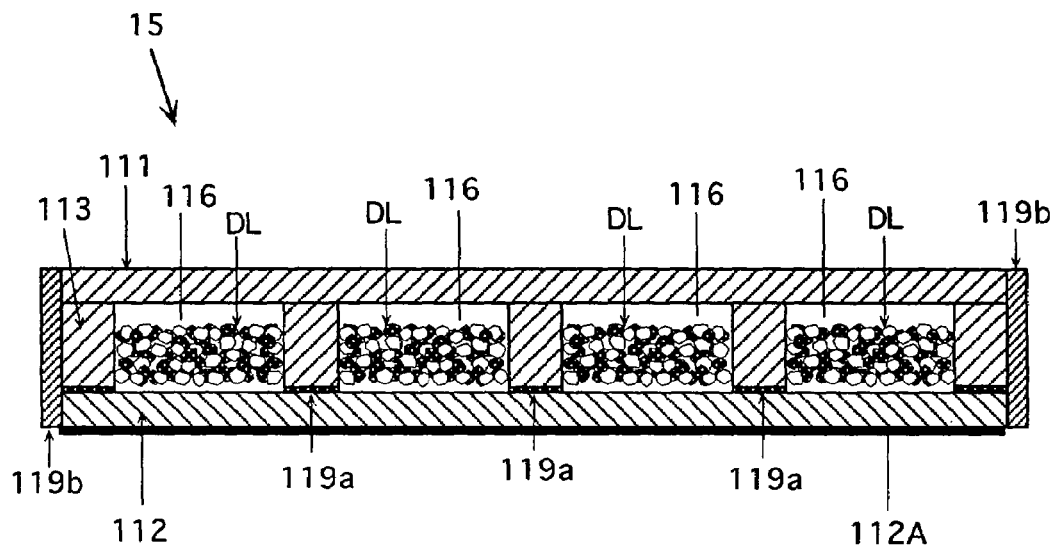
FIG. 10(A) is a sectional view showing another example of the reversible image display medium.
Figure 10B:
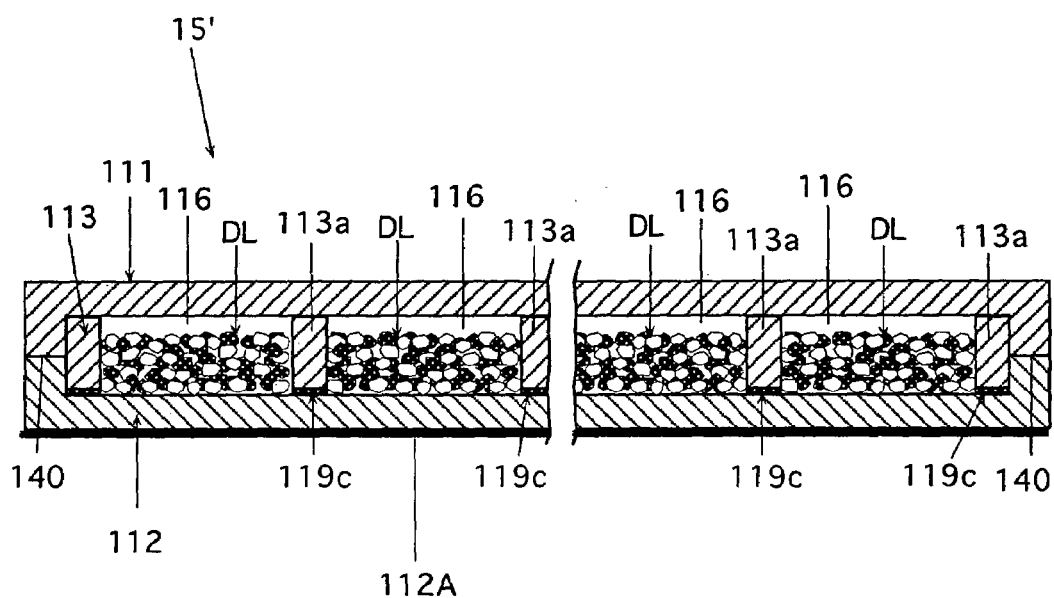
FIG. 10(B) is a sectional view showing a further example of the reversible image display medium.

FIG. 10(A) and FIG. 10(B) show further examples of the reversible image display medium.

The reversible image display medium 15 (15') shown in FIG. 10 (A) (FIG. 10(B)) is identical with the medium 13 (14) except that an electrically conductive film 112A is formed on an outer surface of the second substrate 112 in the medium 13 (14).

In respect of the mediums 15, 15', the internal surface of the substrate 111 on the image observation side, which faces the developer DL, has a surface resistivity of at least $1 \times 10^{12}$ ohm/square and the internal surface of the substrate 112 on the opposed side, which faces the developer DL, has a surface resistivity of $1 \times 10^6$ ohm/square to $1 \times 10^{12}$ ohm/square.

The internal surface of at least the substrate 111, which faces the developer DL, among the substrates 111, 112 has a surface average median roughness Ra of 0.2 μm to 0.5 μm.

The external surface of the substrate 111 on the image observation side has a surface average median roughness Ra of 0.2 μm to 0.7 μm.

The medium 15 (15') is identical in other respects with the medium 13 (14). In FIG. 10(A) and FIG. 10(B), the same components and parts as in the medium 13 (14) are indicated with the same reference symbols.

In image display by the mediums 15, 15', for example, the electrically conductive film 112A is set to a ground potential or like proper potential, and a) an electrostatic latent image corresponding to the image to be formed is directly formed on the first substrate 111, or b) an image carrier carrying the electrostatic latent image corresponding to the image to be formed is contacted with (or made close to) the first substrate 111, whereby an image can be displayed by application of electric field for driving the developing particles to the developer DL.

Optionally the second substrate 112 may be made electrically conductive by dispersing an electrically conductive material, instead of provision of the electrically conductive film 112A and may be set to a ground potential or like proper potential.

Each of the image display mediums already described with reference to the drawings and the image display method utilizing the mediums can repeat the image display and image erasure.

The developing particles WP and BP are contained in the cell, and it is not necessary to supply externally the developer into the cell. Thereby, it is possible to suppress significantly the use of medium such as paper sheets and consumable materials such as developer, which are required for image display in the prior art. Since a heat energy for melting and fixing the toner onto the medium is not required in contrast to the conventional image display, the image forming energy can be reduced. Accordingly, it is possible to satisfy the present demand for reduction in environmental loads.

Since each of the mediums 11 to 15' employs the dry developer DL including developing particles WP and BP of different colors, one kind of the developing particles WP (or BP) can hide the other kind of developing particles BP (or WP) to a higher extent so that the image display in higher contrast can be achieved.

The developing particles WP and BP accommodated in the cell are charged to the different polarities, respectively, and therefore can be easily moved for image display by the Coulomb force applied thereto. This also improves the contrast for image display, and can suppress remaining of the last image. Further, the image display can be quickly performed, and the drive voltage for image display can be lowered.

Further, employment of the dry developer DL can suppress settling and condensation of the developing particles so that lowering in contrast for the image display can be suppressed, and the image display can be stably performed for a long time. Since the settling and condensation of the developing particles are suppressed, remaining of the last displayed image can be suppressed. Since the change in quality with time is suppressed in the dry developer DL, this also allows stable image display for a long time.

When images are displayed by forming an electrostatic latent image on the substrate 111 (112) on the image observation side which is not provided with any internal electrode in the medium 12 (12'), the internal surface of the substrate 111 (112) of the medium 12 (12'), which faces the developer DL, has a surface resistivity of at least $1 \times 10^{12}$ ohm/square so that the electrostatic latent image formed on the substrate can be firmly held and high quality images can be displayed.

The internal surface of the substrate 111 (112) on the image observation side which is not provided with any internal electrode in the medium 12 (12') has a surface average median roughness Ra of 0.2 μm to 0.5 μm. Therefore, it is possible to suppress the unneeded firm adherence of the developing particles to the substrate and to control the occurrence of remaining images, allowing display of high quality images.

When images are displayed by forming an electrostatic latent image on the substrate 111 on the image observation side which is not provided with any internal electrode in the mediums 13, 14, 15 and 15', the internal surface of the substrate 111 of the medium 13, 14, 15 and 15' which surface faces the developing particles has a surface resistivity of at least $1 \times 10^{12}$ ohm/square so that the electrostatic latent image formed on the substrate can be firmly held. Further, since the internal surface of the substrate 112 which surface faces the developer DL has a surface resistivity of $1 \times 10^6$ ohm/square to $1 \times 10^{12}$ ohm/square, the images displayed in the case of mediums being overlapped can be stably retained, and remaining of last images is suppressed in erasure of images and in rewriting thereof, resulting in suppressed image irregularity. Thereby high quality images can be displayed.

The developer-facing internal surface of at least the substrate 111 among the substrates 111 and 112 which is not provided with any internal electrode in the mediums 13, 14, 15 and 15' has a surface average median roughness Ra of 0.2 μm to 0.5 μm. Therefore, it is possible to suppress the unneeded adherence of the developing particles to the substrate and to control the occurrence of remaining images, allowing display of high quality images.

The external surface of the substrate on the image observation side in any of the mediums 11 to 15' has a surface average median roughness Ra of 0.2 μm to 0.7 μm, resulting, when the displayed image is seen, in controlled light quantity of regular reflection (gloss) and suppressed scattering of light, and displayed image in good contrast can be easily seen.

Any one of the mediums 11 to 15' can display images in high resolution as compared with the conventional electrophoretic display.

The mediums except for the medium 11 can display images in higher resolution as compared with the medium 11 in which the resolution is affected by the size of the pixel electrodes 114a.

Now, description is given below on examples of image display operation using mediums 12, 12', 13, 14, 15 and 15', as well as on image forming apparatuses.

Figure 11:
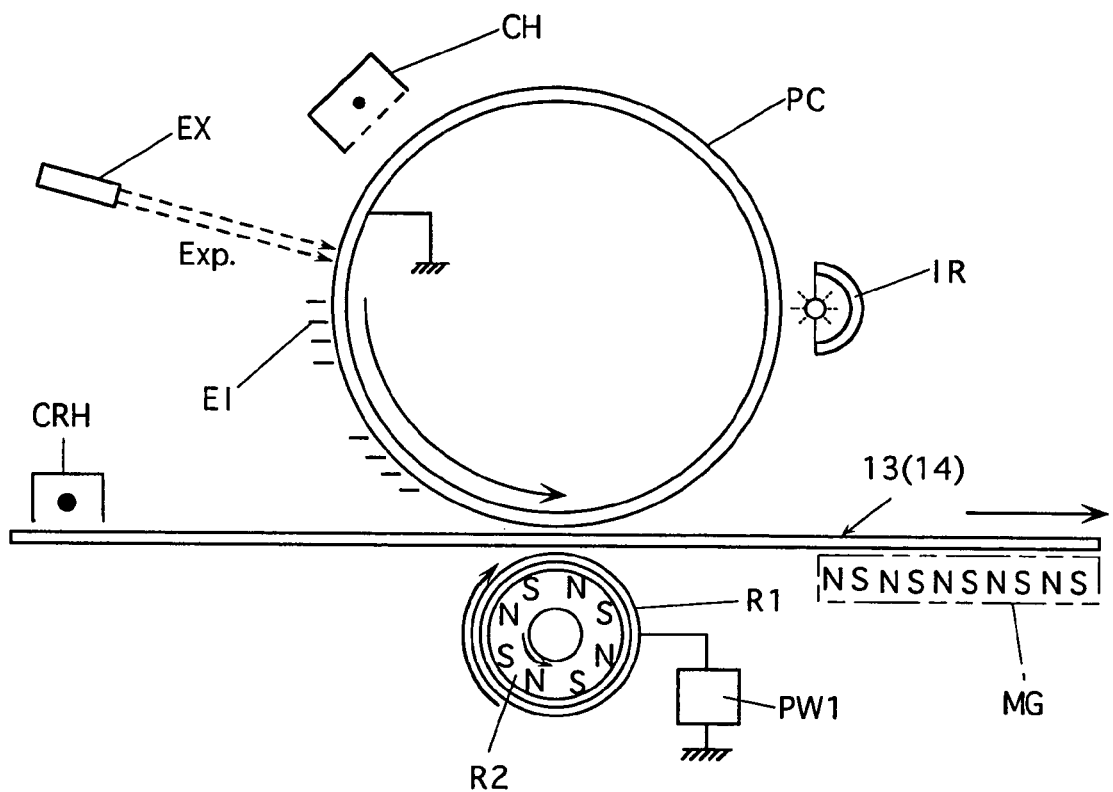
FIG. 11 is a view schematically showing an example of an image forming apparatus having an external electrostatic latent image forming device.

The image forming apparatus shown in FIG. 11 includes a photosensitive drum PC which is driven to rotate in the direction of an arrow in the drawing. Provided around the photosensitive drum PC are a scorotron charger CH, a laser image exposing device EX, and an eraser lamp IR. The electrode roller R1 which is driven to rotate is provided under the drum PC. The electrode roller R1 is a developing electrode roller for forming an electrostatic field for image display. The electrode roller R1 can be supplied with a bias voltage from the power source PW1 and may be internally provided with a rotary magnetic pole roller R2 which is driven to rotate in a direction opposite to that of the roller R1 (or which is driven to rotate reciprocatingly).

After the surface of the drum PC is charged by the charger CH, image exposure is performed on the charged region by the laser image exposing device EX to form an electrostatic latent image E1 on the drum PC. On the other hand, the electrode roller R1 is supplied with a bias voltage from the power source PW1. Optionally the electrode roller R1 may be set to a ground potential.

Then, e.g. the medium 13 or 14 is sent between the drum PC and the electrode roller R1 in synchronization with the electrostatic latent image E1 on the drum PC. In this operation, the surface of the medium 13 (14) is uniformly charged by the charger CRH such as a corona charger to carry a predetermined potential.

Figure 7B:
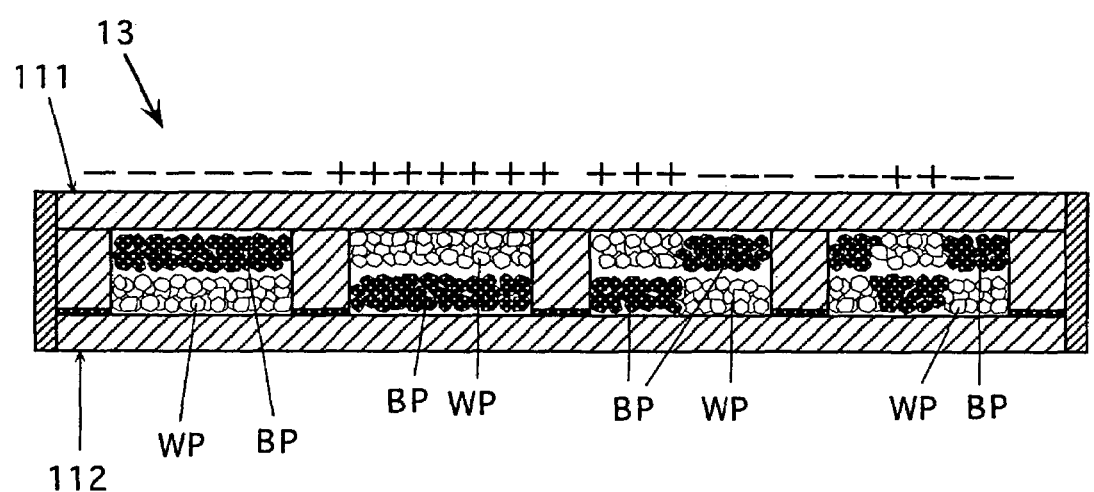
Figure 8B:
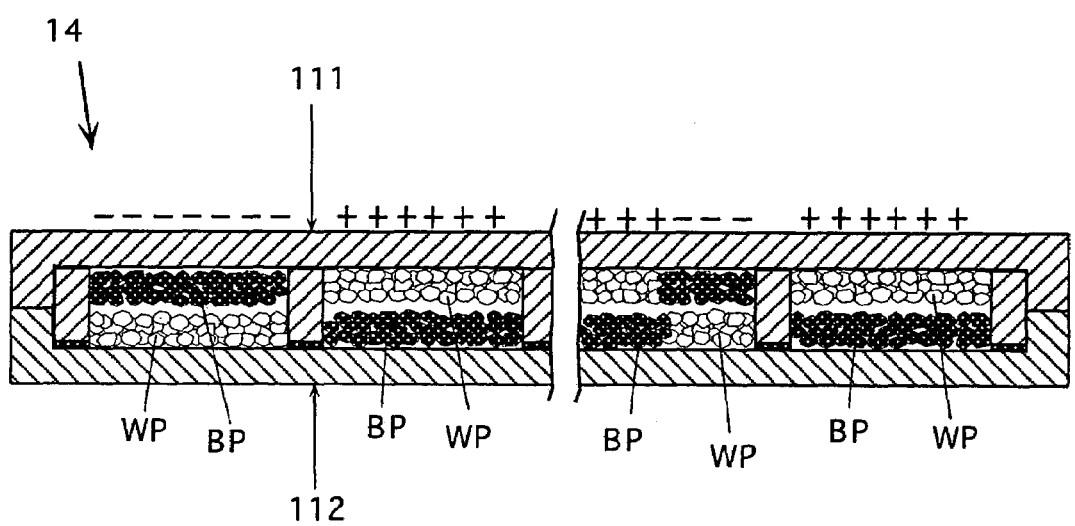

In this way, an electrostatic field is formed based on the electrostatic latent image E1 and applied to the developing particles BP, WP of the developer DL accommodated in the cells 116 of the medium 13 (14), whereby the developing particles are moved by the Coulomb force exerted between the electrostatic field and the charged developing particles. Subsequently the white and black particles WP, BP mingled as shown in FIG. 7(A) or FIG. 8(A) are moved according to the electric field as shown in FIG. 7(B) or FIG. 8(B), whereby images can be displayed in the predetermined contrast.

After image display as described above, the charges on the surface of the photosensitive drum PC are erased by the eraser lamp IR to make ready for the next printing.

It is not essential that the surface of the medium 13 (14) be charged by the charger CRH.

When the developer DL contains magnetic developing particles in image display, e.g. black developing particles BP are magnetic, the magnetic pole roller R2 is provided and rotated whereby the developer DL in the cells 116 is stirred and the developing particles BP, WP become easily movable to accomplish display of better images with lower drive voltage.

If the developer DL contains magnetic developing particles in the medium 11 shown in FIGS. 1 and 2, the rotary magnetic pole roller R2 is usable as indicated with a chain line in FIG. 2.

Optionally, a magnet plate MG with alternately arranged S and N magnetic poles may be provided downstream in a medium feed path as shown with a chain line in FIG. 11 instead of the rotary magnetic pole roller R2.

Using the mediums 12, 12' or the mediums 15, 15', image display can be also achieved by this image forming apparatus. When images are displayed on the medium 12, 12', 15 or 15', the following electrodes or the like may be grounded or supplied with a bias voltage: the second electrode 115 in the medium 12, the pixel electrodes 114a in the medium 12' and the electrically conductive film 112A in the mediums 15, 15'.

Figure 12A:
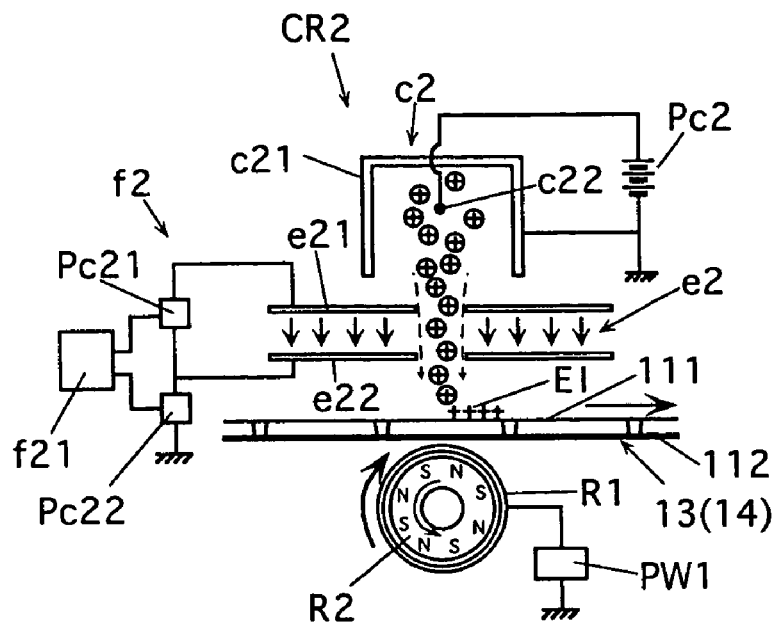
FIG. 12(A) and FIG. 12(B) show a schematic view showing the structure of an example of an image forming apparatus having an ion flow type direct electrostatic latent image forming device.

The image forming apparatus shown in FIG. 12(A) includes a direct electrostatic latent image forming device CR2 of an ion flow type. The device CR2 includes a corona ion generating portion c2 for generating corona ions, a write electrode e2 for leading the corona ions generated by the ion generating portion onto the surface of, e.g., the first substrate 111 in the medium 13 (or 14), a write electrode control circuit f2 for applying to the write electrode e2 the voltage, which is used for leading the positive or negative corona ions to the pixel corresponding portion on the surface of the substrate 111 in accordance with the image to be displayed.

The corona ion generating portion c2 includes a shield casing c21 and a corona wire c22, which is stretched in the casing c21. The corona wire c22 is formed of, e.g., gold-plated tungsten wire of 60 μm to 120 μm in diameter. A power source Pc2 applies a positive or negative voltage (4 kV to 10 kV) to the wire c22 for generating the corona ions.

The write electrode e2 is opposed to a portion of the shield casing c21, which faces the first substrate 111 of the medium 13 (or medium 14). The write electrode e2 is formed of upper and lower electrodes e21 and e22, and is provided at its center with a hole, through which the corona ions can flow.

The electrode control circuit f2 includes a control power source Pc21, a bias power source Pc22 and a control portion f21. The control portion f21 can apply to the electrodes e21 and e22 the ion leading voltages corresponding to the polarity of the ions to be led toward the medium 13.

Under the control by the control portion f21, the positive and negative voltages are applied to the upper and lower electrodes e21 and e22, respectively, whereby the positive corona ions can be led to the medium (FIG. 12(A)). By applying the negative and positive voltages to the upper and lower electrodes e21 and e22, respectively, the positive corona ions can be confined (FIG. 12(B)).

The electrode roller R1 is opposed to the write electrode e2, and is supplied with a positive bias voltage from the power source PW1 or the roller R1 is grounded. The roller R1 is internally provided with a magnetic pole roller R2, which is driven to rotate.

Figure 12B:
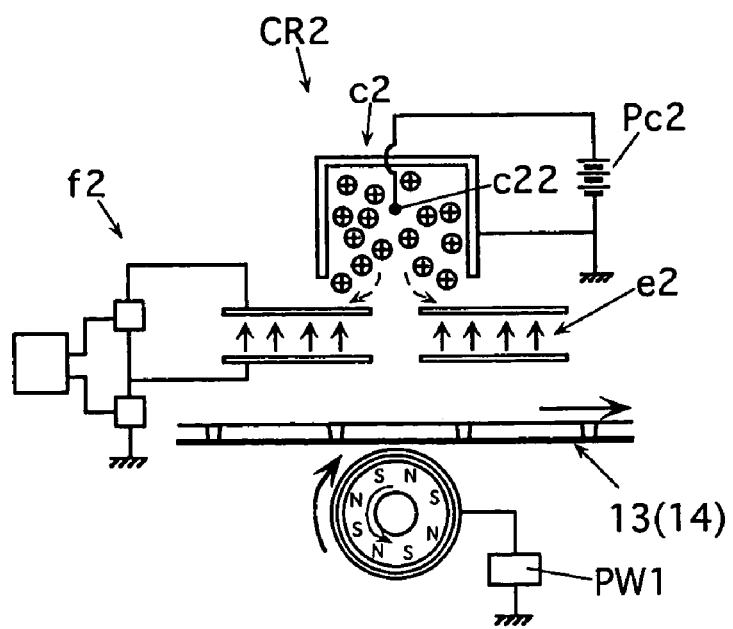

The surface of the medium 13 (or 14) is uniformly charged to a predetermined potential by a charger such as corona charger and the charged medium 13 (14) is moved relatively to the device CR2. At the same time, the electrode roller R1 is driven to rotate in the medium feed direction, and the magnetic pole roller R2 is rotated in the opposite direction. In accordance with the instruction by the control portion f21, positive corona ions are led to the predetermined pixel corresponding portion corresponding to the image to be displayed among the plurality of pixel corresponding portions on the surface of the first substrate 111, as shown in FIG. 12(A), and outflow of the ions are prevented for the other pixels as shown in FIG. 12(B). Thus the image display on the medium 13 (or 14) can be performed as shown in FIGS. 7(B) and 8(B).

It is not essential that the surface of the medium 13 (or 14) is previously charged. The discharging wire c22 in the device CR2 may be replaced with solid discharging elements.

Using the mediums 12, 12' or the mediums 15, 15', image display can be achieved by this image forming apparatus. When images are displayed on these medium 12, 12', 15 or 15', the following electrodes or the like may be used instead of the electrode roller R1 and may be grounded or supplied with a bias voltage: the second electrode 115 in the medium 12, the pixel electrodes 114a in the medium 12' and the electrically conductive film 112A in the mediums 15, 15'.

The electrostatic latent image forming device CR2 shown in FIG. 12(A) utilizes the discharging phenomenon. Instead of it, electrostatic latent image forming devices of various discharging types other than the above may be utilized.

Figure 13:
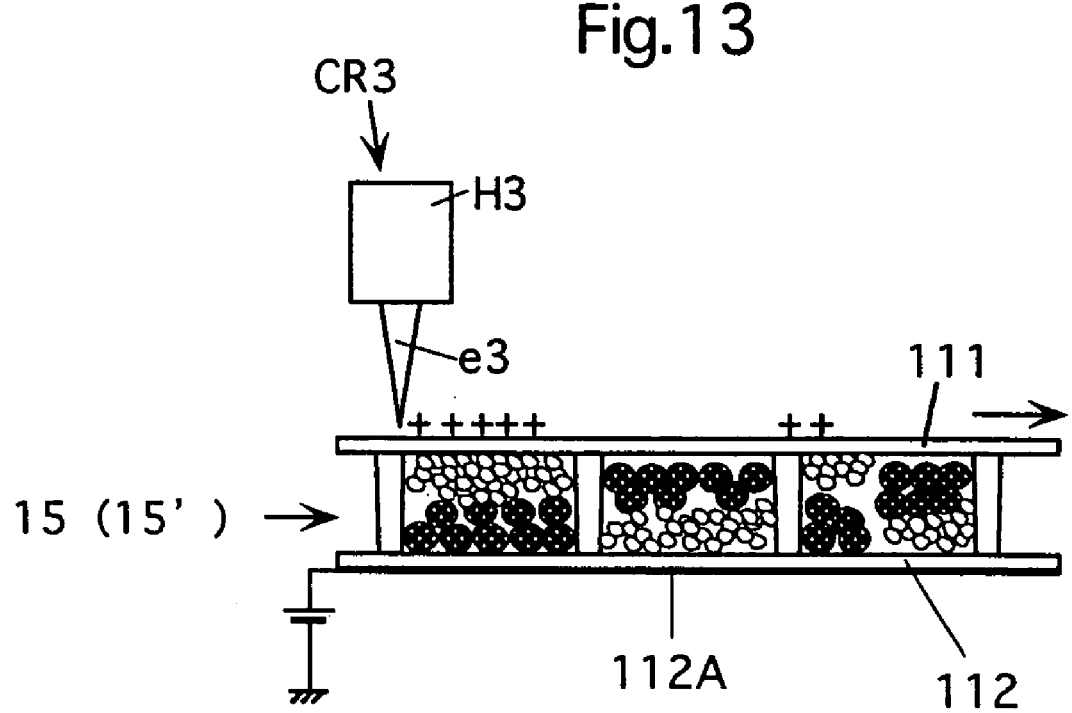
FIG. 13 is a schematic view showing the structure of an example of an image forming apparatus having a multi-stylus type direct electrostatic latent image forming device.

The image forming apparatus shown in FIG. 13 includes a direct electrostatic latent image forming device CR3 of the multi-stylus type. The device CR3 includes a multi-stylus head H3 having a plurality of electrodes e3, which are arranged in the main scanning direction of, e.g., medium 15 (or 15'), and are arranged close to the first substrate 111. A signal voltage is applied to each electrode e3 for applying electrostatic latent image charges to the pixel corresponding portion on the surface of the first substrate 111 in accordance with the image to be displayed. The medium 15 (or 15') is transported relatively to the head H3, e.g., while applying a bias to the conductive film 112A of the second substrate 112 or the film 112A is grounded so that the image display is performed.

Using the mediums 12, 12', images can be formed by the foregoing image forming apparatus. In this case, the second electrode 115 of the medium 12 and the electrodes 114a of the medium 12' may be supplied with a bias voltage, when so required.

In the mediums 13, 14, the outer surface of the second substrate 112 may be supplied with a bias voltage or it may be contacted with an external electrode which can be grounded, whereby images can be displayed by the foregoing image forming apparatus.

Figure 14:
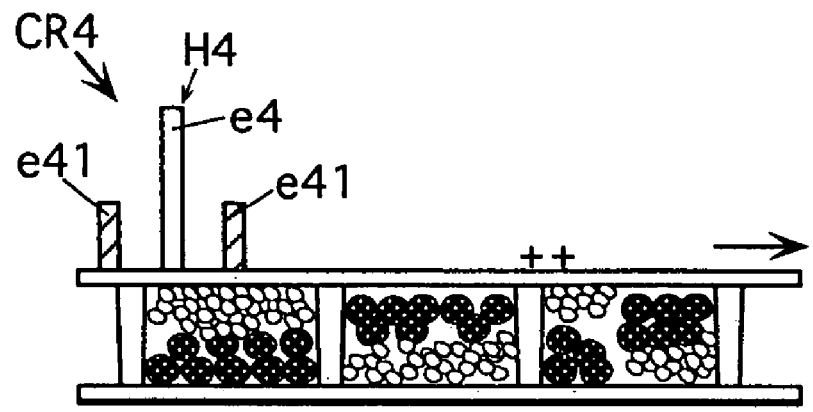
FIG. 14 is a schematic view showing the structure of an example of an image forming apparatus having a multi-stylus type direct electrostatic latent image forming device provided with neighboring control electrodes.

The image forming apparatus shown in FIG. 14 includes a direct electrostatic latent image forming device CR4 of the charge injection type. The device CR4 is of a multi-stylus type, and has an electrostatic record head H4, in which a plurality of record electrodes e4 are arranged in the main scanning direction of the medium, and neighboring control electrodes e41 are arranged close to the record electrodes e4. This head is located, e.g., near the medium, and the control electrodes e41 of the head H4 are successively and sequentially supplied with a voltage nearly equal to half the voltage (record voltage) required for the image recording. Also, the record electrodes e4 are supplied with the image signal voltage nearly equal to half the record voltage. Thereby, the electrostatic latent image can be formed on the medium located immediately under the record electrode.

Now, description is given below to specific examples of developing particles and developer, and to specific examples of the reversible image display medium and experimental examples using the image display mediums.

[I]Examples of Adjustment of Surface Resistivity and Surface Roughness of Substrate Surface Facing the Developer <Developing Particles and Developer>

White Developing Particles WP

In a Henschel mixer were thoroughly mixed 100 parts by weight of thermoplastic polyester resin (softening point: 121° C., Tg: 67° C.), 40 parts by weight of titanium oxide (Ishihara Sangyo Kaisha, Ltd: CR-50) and 5 parts by weight of salicylic acid-zinc complex (minus-charge-controlling agent, Orient Chemical Co., Ltd.: Bontron E-84). The mixture was further mixed by a twin-screw extruder and then cooled. The mixture was roughly pulverized, then pulverized by a jet mil and classified with wind to obtain white particles which have a volume average particle size of 10.1 μm.

To the white fine particles having the above size was added 0.3 parts by weight of hydrophobic silica particles (Nihon Aerosil Co., Ltd.: Aerosil R-972). The mixture was mixed by a Henschel mixer to prepare white developing particles.

In a Henschel mixer were thoroughly mixed 100 parts by weight of styrene-n-butyl methacrylate resin (softening point: 132° C., Tg: 65° C.), 2 parts by weight of carbon black (Lion Oil & Fat Co., Ltd.: Ketchen Black), 1.5 parts by weight of silica (Nihon Aerosil Co., Ltd.: # 200) and 500 parts by weight of magnetic powder containing magnetite (RB-BL, Titan Kogyo Co., Ltd.). The mixture was further mixed by a kneader.

After cooling, the mixture was roughly pulverized by a feather mill, then finely pulverized by a jet mill and classified with wind to obtain black particles BP which have a volume average particle size of 25 μm.

Preparation of Developer DL

The white particles WP (30 g) and the black particles BP (70 g) were placed into a polyethylene bottle. The bottle was rotated by a ball mill pedestal to perform kneading and mixing for 30 minutes to obtain developer DL. The white developing particles WP were negatively charged and black developing particles BP were positively charged in the developer.

<Reversible Image Display Medium D1>

The reversible image display medium D1 is of the same type as the medium 13 shown in FIG. 7(A) and was prepared as follows.

A film of UV-curing resin of 100 μm thickness was brought close to the first substrate 111 formed of a transparent PET (polyethylene terephthalate) film of 25 μm thickness. Over the UV-curing resin film was laid a photomask opened in a specified pattern. The top of the photomask was irradiated with UV rays, followed by development and washing. A grid-like partition member 113 was formed on the substrate 111 (see FIG. 3). Partition walls 113a forming the partition member 113 had a thickness (width) α (50 μm), a height h (100 μm), and a wall space PT (1mm) (space between neighboring wall portions). The substrate 111 was on the image observation side (on which an electrostatic latent image was formed).

A solution of a surfactant was applied to the surface of the partition member 113 on the substrate 111 and dried to adjust the resistance.

The developer DL was placed into each cavity surrounded with the partition wall of the grid-like partition member 113 on the first substrate 111. The volume proportion of the developer placed into the cavities was 30% based on the volume of the cavity.

A photo-curing adhesive 119a (see FIG. 7(A)) was applied to a small thickness only to the top of the partition member 113 on the substrate 111. Subsequently, a PET film (second substrate 112) of 25 μm in thickness containing carbon black was brought close to the adhesive. Then, the adhesive was cured by UV irradiation to adhere the film.

Thereafter, the peripheries of the first and second substrates 111, 112 were heat-sealed instead of sealing with the epoxy resin adhesive 119b as shown in FIG. 7(A).

In this way, a medium D1 of the type shown in FIG. 7(A) was produced.

<Reversible Image Display Mediums D2 to D11>

Reversible image display mediums D2 to D11 are of the same type as the reversible image display medium D1. They are different from each other in surface resistivity of the developer-facing internal surface of the substrate 111 on the side for forming an electrostatic latent image, or they are further different from each other in surface resistivity of the developer-facing internal surface of the substrate 112 on the opposed side.

<Reversible Image Display Mediums D12 to D15>

Reversible image display mediums D12 to D15 are of the same type as the reversible image display medium D1. They are different from each other in surface roughness of the developer-facing internal surface of the substrate 111. Different degrees of surface roughness were created by blasting or heat-press embossing or otherwise.

Table 1 shows the surface resistivity of the developer-facing surface of the substrate 111 or 112 in each medium, and the surface roughness Ra of the developer-facing surface of the substrate 111 in each medium.

In any of mediums D1 to D15, the developer-facing surface of the substrate 112 had a surface roughness Ra of 0.25 μm.

TABLE 1

| medium | substrate 111 | | opposite substrate 112 |
|---|---|---|---|
| | surface resistivity $\Omega/\square$ | surface roughness Ra μm | surface resistivity $\Omega/\square$ |
| D1 | $1.20 \times 10^{15}$ | 0.25 | $3.50 \times 10^{5}$ |
| D2 | $1.20 \times 10^{15}$ | 0.25 | $4.20 \times 10^{6}$ |
| D3 | $1.20 \times 10^{15}$ | 0.25 | $1.50 \times 10^{9}$ |
| D4 | $1.20 \times 10^{15}$ | 0.25 | $2.20 \times 10^{11}$ |
| D5 | $1.20 \times 10^{15}$ | 0.25 | $5.10 \times 10^{12}$ |
| D6 | $1.20 \times 10^{15}$ | 0.25 | $3.20 \times 10^{13}$ |
| D7 | $1.20 \times 10^{15}$ | 0.25 | $1.20 \times 10^{15}$ |
| D8 | $2.30 \times 10^{13}$ | 0.25 | $1.50 \times 10^{9}$ |
| D9 | $2.20 \times 10^{12}$ | 0.25 | $1.50 \times 10^{9}$ |
| D10 | $4.70 \times 10^{11}$ | 0.25 | $1.50 \times 10^{9}$ |
| D11 | $5.70 \times 10^{9}$ | 0.25 | $1.50 \times 10^{9}$ |
| D12 | $1.20 \times 10^{15}$ | 0.16 | $1.50 \times 10^{9}$ |
| D13 | $1.20 \times 10^{15}$ | 0.52 | $1.50 \times 10^{9}$ |
| D14 | $1.20 \times 10^{15}$ | 0.68 | $1.50 \times 10^{9}$ |
| D15 | $1.20 \times 10^{15}$ | 0.85 | $1.50 \times 10^{9}$ |

Image display was performed using any of the mediums D1 to D15 by the image forming apparatus including the ion flow type direct electrostatic latent image forming device CR2 as shown in FIG. 12(A) and FIG. 12(B).

The surface of the first substrate 111 was uniformly charged by a corona charger (not shown) to carry a negative polarity potential (−500 V). The second substrate 112 of the charged medium was set to a ground potential. Then, positive corona ions were led to the predetermined pixel corresponding portions corresponding to the image to be displayed among the plurality of pixel corresponding portions on the surface of the first substrate 111 of the medium. The portions were charged to carry a positive polarity potential (+500 V) and to carry the same potential in terms of absolute value as the above negatively charged potential (−500V). For the other pixels, only a bias potential (ground potential here) was applied. Thereby the positive corona ion-charged portions and the non-charged portions were charged to carry the same potential (500 V) in terms of absolute value and to give different polarities. Thus, image display was conducted such that the positive corona ion-loaded portions were displayed in white by negatively charged white developing particles WP and the positive corona ion-unloaded portions were displayed in black by positively charged black developing particles BP.

In image display, the magnetic pole roller R2 was rotated to apply a stirring force to the developing particles in the medium, whereby images were smoothly displayed.

Using each of the mediums D1 to D15, image display was performed to evaluate the contrast of displayed images, and to evaluate the initial images, the images after repeated image display, and the image stability after repeated image display (suppressed remaining of last images).

The contrast was evaluated in terms of an average image density which was obtained by measuring the image density (Bk density) of the black portion and the image density (W density) of the white portion by a reflection densitometer (product of Konica Corporation, Sakura DENSITMETER PDA-65). The average density ratio (Bk av./W av.) of 5.0 or more was rated as good (◯) and that of less than 5.0 as poor (X).

The image stability after repeated image display was evaluated by comparing the average image density of initially displayed images with the average image density of the images (50$^{th}$ images) after repeated image display (after 49 times repetition). When the change of average image density between the initially displayed images and repeatedly displayed images (50 times repetition) was 0.2 or less, it was rated as good (◯). The value of more than 0.2 was rated as not good (X).

The surface resistivity was measured in an environment of 65%RH according to ASTM D-257.

The surface average median roughness Ra of the substrate was measured using a surface roughness measuring instrument (Surfcom 554A manufactured by Tokyo Seimitsu Co., Ltd.) and Pick-up E-DT-S02A for measuring the roughness of soft materials.

The image evaluation results are shown in Table 2.

As apparent from Table 2, when image display is performed by forming an electrostatic latent image, it is suitable that the developer-facing surface of the substrate for carrying the electrostatic latent image has a surface resistivity of at least $1 \times 10^{12}$ ohm/square. On the other hand, it is suitable that the developer-facing surface of the opposed substrate has a surface resistivity of $1 \times 10^6$ ohm/square to $1 \times 10^{12}$ ohm/square.

The same can be mentioned about the image display mediums of the same type as the mediums 14, 15 and 15'.

As also apparent from table 2, the surface of at least one of the substrates, especially the developer-facing surface of the substrate on the image observation side, has suitably a surface

TABLE 2

| | initial image | | | | | | 50th image after 49 times repetition | | | | | |
|---|---|---|---|---|---|---|---|---|---|---|---|---|
| | black portion | | | white portion | | | black portion | | | white portion | | |
| medium | maximum density (Bkmax.) ① | minimum density (Bkmin.) ② | average density (Bk av.) ③ | maximum density (W max.) ④ | minimum density (W min.) ⑤ | average density (W av.) ⑥ | maximum density (Bkmax.) ⑦ | minimum density (Bkmin.) ⑧ | average density (Bk av.) ⑨ | maximum density (W max.) ⑩ | minimum density (W min.) ⑪ | average density (W av.) ⑫ |
| D1 | 1.43 | 0.85 | 1.14 | 0.80 | 0.55 | 0.68 | 1.20 | 0.70 | 0.95 | 0.75 | 0.52 | 0.64 |
| D2 | 1.48 | 1.32 | 1.40 | 0.32 | 0.22 | 0.27 | 1.42 | 1.30 | 1.36 | 0.32 | 0.22 | 0.27 |
| D3 | 1.61 | 1.52 | 1.57 | 0.28 | 0.23 | 0.26 | 1.59 | 1.52 | 1.56 | 0.30 | 0.23 | 0.27 |
| D4 | 1.66 | 1.61 | 1.64 | 0.26 | 0.22 | 0.24 | 1.59 | 1.50 | 1.55 | 0.32 | 0.24 | 0.28 |
| D5 | 1.65 | 1.54 | 1.60 | 0.26 | 0.24 | 0.25 | 1.52 | 1.48 | 1.50 | 0.30 | 0.25 | 0.28 |
| D6 | 1.60 | 1.42 | 1.51 | 0.24 | 0.20 | 0.22 | 1.30 | 1.15 | 1.23 | 0.35 | 0.28 | 0.32 |
| D7 | 1.61 | 1.44 | 1.53 | 0.32 | 0.23 | 0.28 | 1.35 | 1.20 | 1.28 | 0.45 | 0.30 | 0.38 |
| D8 | 1.48 | 1.29 | 1.38 | 0.28 | 0.24 | 0.26 | 1.43 | 1.29 | 1.36 | 0.28 | 0.24 | 0.26 |
| D9 | 1.43 | 1.25 | 1.34 | 0.30 | 0.23 | 0.27 | 1.43 | 1.25 | 1.34 | 0.30 | 0.23 | 0.27 |
| D10 | 1.42 | 1.25 | 4.34 | 0.39 | 0.30 | 0.35 | 1.36 | 1.25 | 1.31 | 0.39 | 0.30 | 0.35 |
| D11 | 1.33 | 1.15 | 1.24 | 0.42 | 0.32 | 0.37 | 1.25 | 1.15 | 1.20 | 0.42 | 0.32 | 0.37 |
| D12 | 1.61 | 1.46 | 1.54 | 0.32 | .024 | 0.28 | 1.40 | 1.25 | 1.33 | 0.45 | 0.28 | 0.37 |
| D13 | 1.62 | 1.46 | 1.54 | 0.30 | 0.23 | 0.27 | 1.62 | 1.46 | 1.54 | 0.31 | 0.25 | 0.28 |
| D14 | 1.60 | 1.50 | 1.55 | 0.35 | 0.22 | 0.29 | 1.40 | 1.28 | 1.34 | 0.48 | 0.30 | 0.39 |
| D15 | 1.58 | 1.45 | 1.52 | 0.33 | 0.25 | 0.29 | 1.32 | 1.16 | 1.24 | 0.55 | 0.38 | 0.47 |

| | initial image | | | | 50th image after 49 times repetition | | | | | |
|---|---|---|---|---|---|---|---|---|---|---|
| medium | contrast Bk av./W av. ③/⑥ | | image irregularity Bkmax.-Bkmin. ①-② | | contrast Bk av./W av. ⑨/⑫ | | image irregularity Bkmax.-Bkmin. ⑦-⑧ | | image stability ③-⑨ | overall-evaluation |
| D1 | 1.69 | X | 0.58 | X | 1.50 | X | 0.50 | X | 0.19 | X |
| D2 | 5.19 | ◯ | 0.16 | ◯ | 5.04 | ◯ | 0.12 | ◯ | 0.04 | ◯ |
| D3 | 6.14 | ◯ | 0.09 | ◯ | 5.87 | ◯ | 0.07 | ◯ | 0.01 | ◯ |
| D4 | 6.81 | ◯ | 0.05 | ◯ | 5.52 | ◯ | 0.09 | ◯ | 0.09 | ◯ |
| D5 | 6.38 | ◯ | 0.11 | ◯ | 5.45 | ◯ | 0.04 | ◯ | 0.10 | ◯ |
| D6 | 6.86 | ◯ | 0.18 | ◯ | 3.89 | X | 0.15 | ◯ | 0.29 | X |
| D7 | 5.55 | ◯ | 0.17 | ◯ | 3.40 | X | 0.15 | ◯ | 0.25 | X |
| D8 | 5.32 | ◯ | 0.19 | ◯ | 5.22 | ◯ | 0.14 | ◯ | 0.03 | ◯ |
| D9 | 5.06 | ◯ | 0.18 | ◯ | 5.06 | ◯ | 0.18 | ◯ | 0.00 | ◯ |
| D10 | 3.87 | X | 0.17 | ◯ | 3.78 | X | 0.11 | ◯ | 0.03 | ◯ |
| D11 | 3.33 | X | 0.18 | ◯ | 3.22 | X | 0.10 | ◯ | 0.04 | ◯ |
| D12 | 5.48 | ◯ | 0.15 | ◯ | 3.63 | X | 0.15 | ◯ | 0.21 | X |
| D13 | 5.81 | ◯ | 0.16 | ◯ | 5.50 | ◯ | 0.16 | ◯ | 0.00 | ◯ |
| D14 | 5.44 | ◯ | 0.10 | ◯ | 3.44 | X | 0.12 | ◯ | 0.21 | X |
| D15 | 5.22 | ◯ | 0.13 | ◯ | 2.67 | X | 0.16 | ◯ | 0.28 | X | roughness in terms of a surface average median roughness Ra in a range of 0.2 μm to 0.5 μm.

The same can be mentioned about the image display mediums of the same type as the mediums 12, 12', 14, 15 and 15'.

[II] Examples of Adjustment of Surface Roughness of External Surface of Substrate on the Image Observation Side <Developing Particles and Developer>

The same developing particles and developer as used in the experiments in foregoing [I] descriptive portion were employed.

<Reversible Image Display Mediums D1' to D9'>

Reversible image display mediums D1' to D9' are of the same type as the reversible image display medium 13 shown in FIG. 7(A), and were prepared as follows.

A plurality of transparent PET (polyethylene terephthalate) films of 25 μm thickness were provided. A thermoplastic transparent resin was uniformly applied to one surface of each film. On the resin layer was laid a sheet for forming a shape, which was used for obtaining different surface roughness degrees. The sheet was pressed on the resin layer with heating. The press processing was conducted at 80° C. and 10 kg/cm$^2$ for 30 minutes.

After cooling, the shape-forming sheet was peeled off to give a first substrate 111 on the image observation side (side for forming an electrostatic latent image) in which the external surface had controlled surface average median roughness.

A film of UV-curing resin of 100 μm thickness was brought close to the surface roughness-noncontrolled internal surface of the substrate 111 on the image observation side. Over the resin film was laid a photomask opened in a specified pattern. The top of the photomask was irradiated with UV rays, followed by development and washing. A grid-like partition member 113 was formed on the substrate 111 (see FIG. 3). Partition walls 113a forming the partition member 113 had a thickness (width) α (50 μm), a height h (100 μm), and a wall space pt (1 mm).

Then, the developer DL was placed into each cavity surrounded with the partition wall of the grid-like partition member 113 of the first substrate 111. The volume proportion of the developer placed into the cavity was 30% based on the volume of the cavity.

A photo-curing adhesive 119a (see FIG. 7(A)) was applied to a small thickness only to the top of the partition member 113 on the substrate 111. Thereafter the second substrate 112 formed of a transparent PET film of 25 μm thickness containing carbon black was closely laid on the adhesive, followed by curing the adhesive by UV irradiation to adhere the film.

Thereafter, the peripheries of the first and second substrates 111, 112 were heat-sealed instead of sealing with the epoxy resin adhesive 119b as shown in FIG. 7(A).

The procedure gave 9 kinds of mediums D1' to D9' of the type shown in FIG. 7(A) in which the external surface of the substrate 111 on the image observation side had different surface average median roughnesses. Table 3 shows the surface average median roughness of the mediums.

The surface average median roughness Ra was measured using a surface roughness measuring instrument (Surfcom 554A manufactured by Tokyo Seimitsu Co., Ltd.) and Pickup E-DT-S02A for measuring the roughness of soft materials.

TABLE 3

| medium | external surface of substrate on image observation side average median roughness Ra μm |
|---|---|
| D1' | 0.12 |
| D2' | 0.18 |
| D3' | 0.21 |
| D4' | 0.33 |
| D5' | 0.45 |
| D6' | 0.62 |
| D7' | 0.75 |
| D8' | 0.87 |
| D9' | 1.05 |

Image display was performed using any of the mediums D1' to D9' using the image forming apparatus including the ion flow type direct electrostatic latent image forming device CR2 as shown in FIG. 12(A) and FIG. 12(B).

The surface of the first substrate 111 was uniformly charged by a corona charger (not shown) to carry a negative polarity potential (−500 V). The second substrate 112 of the charged medium was set to a ground potential. Then, positive corona ions were led to the predetermined pixel corresponding portions corresponding to the image to be displayed among the plurality of pixel corresponding portions on the surface of the first substrate 111 of the medium. The portions were charged to carry a positive polarity potential (+500 V) and to the same potential in terms of absolute value as the above negative polarity charged potential (−500). For the other pixels, only a bias potential (ground potential) was applied. Thereby the positive corona ion-charged portions and the non-charged portions were charged to carry the same potential (500 V) in terms of absolute value and to give different polarities. Thus, image display was conducted such that the positive corona ion-loaded portions were displayed in white by negatively charged white developing particles WP and the positive corona ion-unloaded portions were displayed in black by positively charged black developing particles BP.

In image display, the magnetic pole roller R2 was rotated to stir the developing particles in the medium, whereby images were smoothly displayed.

Using the mediums D1' to D9', image display was performed to evaluate the contrast and the gloss on the external surface of the substrate on the image observation side.

The contrast was evaluated in terms of an average image density which is obtained by measuring the image density (Bk density) of the black portion and the image density (W density) of the white portion using a reflection densitometer (product of Konica Corporation, Sakura DENSITMETER PDA-65). The average density ratio (Bk av./W av.) of 5.0 or more was rated as good (◯) and that of less than 5.0 as poor (X).

The gloss was measured by a glossimeter (product of Nippon Denshoku Industries Co., Ltd., VG-2000) used at a measuring angle of 20 degrees. The measured value of 40 or less was rated as good (◯). The value of more than 40 was rated as not good (X).

The image evaluation results are shown in Table 4.

TABLE 4

|  | gloss | | image density | | | | overall |
|  |  |  | black portion | white portion | contrast | | |
|  | 20° | | average | average | | | |
| medium | measurement | evaluation | density (Bk av.) | density (W av.) | Bk av./W av. | evaluation | evaluation |
|---|---|---|---|---|---|---|---|
| D1' | 124.0 | X | 1.62 | 0.25 | 6.48 | ○ | X |
| D2' | 58.2 | X | 1.60 | 0.26 | 6.15 | ○ | X |
| D3' | 38.4 | ○ | 1.58 | 0.25 | 6.32 | ○ | ○ |
| D4' | 33.4 | ○ | 1.60 | 0.25 | 6.40 | ○ | ○ |
| D5' | 28.5 | ○ | 1.58 | 0.24 | 6.58 | ○ | ○ |
| D6' | 22.5 | ○ | 1.28 | 0.23 | 5.57 | ○ | ○ |
| D7' | 18.4 | ○ | 1.08 | 0.22 | 4.91 | X | X |
| D8' | 12.5 | ○ | 0.95 | 0.23 | 4.13 | X | X |
| D9' | 10.1 | ○ | 0.82 | 0.20 | 4.10 | X | X |

The overall evaluation of the results in Table 4 is indicated as (○) when the results are good in both of gloss and contrast, while it is indicated as bad (X) when they are not so.

As apparent from table 4, it is suitable that the external surface of at least the substrate on the image observation side among the two substrates for forming the medium has a surface average median roughness Ra of 0.2 μm to 0.7 μm.

The same can be mentioned about the image display mediums of the same type as the mediums 11, 12, 12', 14, 15 and 15'.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reversible image display medium comprising:
   two substrates opposed to each other with a gap therebetween;
   one or more developer accommodating cells formed between the two substrates, each having a periphery surrounded by a partition wall; and
   a dry developer contained in each of the cells, the dry developer containing at least two kinds of frictionally chargeable dry developing particles having different chargeable polarities and different optical reflection densities; wherein
   an image is displayed by applying an electric field corresponding to the image to be formed on one of the two substrates to drive the developing particles in the electric field; and wherein
   a surface, which faces the developing particles, of the substrate on which the electric field is applied has a surface resistivity of at least $1 \times 10^{12}$ ohm/square.

2. The reversible image display medium according to claim 1 wherein a surface, which faces the developing particles, of the substrate opposed to the substrate on which the electric field is applied has a surface resistivity in a range of from $1 \times 10^{6}$ ohm/square to $1 \times 10^{12}$ ohm/square.

3. The reversible image display medium according to claim 2 wherein an external surface of at least the substrate on image observation side among the foregoing substrates has a surface average median roughness Ra of 0.2 μm to 0.7 μm.

4. The reversible image display medium according to claim 2 wherein the surface, which faces the developing particles, of at least one of the two substrates has a surface average median roughness Ra of 0.2 μm to 0.5 μm.

5. The reversible image display medium according to claim 4 wherein an external surface of at least the substrate on image observation side among the foregoing substrates has a surface average median roughness Ra of 0.2 μm to 0.7 μm.

6. The reversible image display medium according to claim 1 wherein a surface, which faces the developing particles, of at least one of the two substrates has a surface average median roughness Ra of 0.2 μm to 0.5 μm.

7. The reversible image display medium according to claim 6 wherein an external surface of at least the substrate on image observation side among the foregoing substrates has a surface average median roughness Ra of 0.2 μm to 0.7 μm.

8. The reversible image display medium according to claim 1 wherein an external surface of at least the substrate on image observation side among the foregoing substrates has a surface average median roughness Ra of 0.2 μm to 0.7 μm.

9. A reversible image display medium comprising:
   two substrates opposed to each other with a gap therebetween;
   one or more developer accommodating cells formed between the two substrates, each having a periphery surrounded by a partition wall; and
   a dry developer contained in each of the cells, the dry developer containing at least two kinds of frictionally chargeable dry developing particles having different chargeable polarities and different optical reflection densities; wherein
   an image is displayed by applying an electric field corresponding to the image to be formed on one of the two substrates to drive the developing particles in the electric field; and wherein
   a surface, which faces the developing particles, of the substrate opposed to the substrate on which the electric field is applied has a surface resistivity in a range of from $1 \times 10^{6}$ ohm/square to $1 \times 10^{12}$ ohm/square.

10. The reversible image display medium according to claim 9 wherein a surface, which faces the developing particles, of at least one of the two substrates has a surface average median roughness Ra of 0.2 μm to 0.5 μm.

11. The reversible image display medium according to claim 10 wherein an external surface of at least the substrate on image observation side among the foregoing substrates has a surface average median roughness Ra of 0.2 μm to 0.7 μm.

12. The reversible image display medium according to claim 9 wherein an external surface of at least the substrate on image observation side among the foregoing substrates has a surface average median roughness Ra of 0.2 μm to 0.7 μm.

* * * * *